(12) United States Patent
Bae et al.

(10) Patent No.: US 12,510,812 B2
(45) Date of Patent: Dec. 30, 2025

(54) PROJECTOR AND DISPLAY APPARATUS EMPLOYING HOLOGRAPHIC OPTICAL ELEMENT

(71) Applicant: SAMSUNG ELECTRONICS CO., LTD., Suwon-si (KR)

(72) Inventors: Jungkweon Bae, Suwon-si (KR); Changmin Keum, Suwon-si (KR); Seunghyun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 474 days.

(21) Appl. No.: 18/091,777

(22) Filed: Dec. 30, 2022

(65) Prior Publication Data

US 2023/0205065 A1    Jun. 29, 2023

Related U.S. Application Data

(63) Continuation of application No. PCT/KR2022/020957, filed on Dec. 21, 2022.

(30) Foreign Application Priority Data

Dec. 24, 2021  (KR) .................... 10-2021-0187768
Mar. 10, 2022  (KR) .................... 10-2022-0030320

(51) Int. Cl.
*G03B 21/14*    (2006.01)
*G02B 5/32*     (2006.01)
(Continued)

(52) U.S. Cl.
CPC ....... *G03B 21/142* (2013.01); *G03B 21/2066* (2013.01); *G03B 21/28* (2013.01); *G02B 5/32* (2013.01)

(58) Field of Classification Search
CPC .. G03B 21/142; G03B 21/2066; G03B 21/28; G03B 21/00; G02B 5/32;
(Continued)

(56) References Cited

U.S. PATENT DOCUMENTS 6,115,152 A    9/2000  Popovich et al.
8,353,599 B2   1/2013  Miyazawa
(Continued)

FOREIGN PATENT DOCUMENTS

JP    2000-111735 A    4/2000
KR    10-2012-0010554 A    2/2012
(Continued)

OTHER PUBLICATIONS

N. Damera-Venkata and N. Chang, "Realizing Super-Resolution with Superimposed Projection", IEEE Conference on Computer Vision and Pattern Recognition, Jun. 18, 2007, (8 pages total).
(Continued)

*Primary Examiner* — Magda Cruz
(74) *Attorney, Agent, or Firm* — Sughrue Mion, PLLC

(57) ABSTRACT

A projector and display apparatus using a holographic optical element are provided. The projector includes a first display panel configured to emit a first beam of a first image, a second display panel configured to emit a second beam of a second image, a first transmissive holographic optical element configured to separate the first beam into a first diffracted beam and a second diffracted beam such that pixels of the first image overlap each other, a second transmissive holographic optical element configured to separate the second beam into a third diffracted beam and a fourth diffracted beam such that pixels of the second image overlap each other, a reflective holographic optical element configured to diffract and reflect the third and fourth diffracted beams in the same direction as the first and second
(Continued)

diffracted beams such that the first image and the second image at least partially overlap each other, and a projection lens.

15 Claims, 32 Drawing Sheets

(51) Int. Cl.
 *G03B 21/20* (2006.01)
 *G03B 21/28* (2006.01)
(58) Field of Classification Search
 CPC ........ G02B 2027/0174; G02B 27/0103; G02B 27/0172; G02B 2027/0147; G03H 1/04; H04N 9/3126; H04N 9/3173; H04N 9/3185; H04N 9/3188
 USPC .......................................................... 353/82
 See application file for complete search history.

(56) References Cited

U.S. PATENT DOCUMENTS

| | | | |
|---|---|---|---|
| 10,133,075 | B2 | 11/2018 | Bailey et al. |
| 10,409,074 | B2 | 9/2019 | Bohn |
| 10,634,925 | B2 | 4/2020 | Grey et al. |
| 10,698,366 | B2 | 6/2020 | Lim et al. |
| 10,845,570 | B2 | 11/2020 | Aschwanden et al. |
| 10,866,422 | B2 | 12/2020 | Tuomisto et al. |
| 10,958,884 | B1 | 3/2021 | Ghazaryan |
| 11,487,117 | B2 | 11/2022 | Kim et al. |
| 2007/0070504 | A1* | 3/2007 | Akutsu .................. G02B 5/32 359/566 |
| 2007/0097323 | A1 | 5/2007 | Otis et al. |
| 2011/0090465 | A1 | 4/2011 | Watanabe et al. |
| 2012/0019883 | A1 | 1/2012 | Chae et al. |
| 2015/0310789 | A1 | 10/2015 | Heide et al. |
| 2016/0037147 | A1 | 2/2016 | Kempf et al. |
| 2016/0170215 | A1* | 6/2016 | Mukawa .............. G02B 6/0026 359/13 |
| 2018/0143449 | A1 | 5/2018 | Popovich et al. |
| 2018/0292787 | A1 | 10/2018 | Lim et al. |
| 2019/0227317 | A1* | 7/2019 | Trail .................. G03B 21/2033 |
| 2020/0145627 | A1 | 5/2020 | Hosaka et al. |
| 2020/0192092 | A1* | 6/2020 | Lee .................... G02B 27/0172 |
| 2020/0225416 | A1 | 7/2020 | Bablumyan et al. |
| 2021/0033857 | A1* | 2/2021 | Waldern ................ G02B 6/005 |
| 2021/0088800 | A1* | 3/2021 | Horimai .................... F21V 9/00 |
| 2021/0124171 | A1* | 4/2021 | Kim .................... G02B 27/4205 |
| 2021/0141237 | A1 | 5/2021 | Schowengerdt |
| 2021/0405386 | A1 | 12/2021 | Kim et al. |

FOREIGN PATENT DOCUMENTS

| | | |
|---|---|---|
| KR | 10-1742984 B1 | 6/2017 |
| KR | 10-1893590 B1 | 8/2018 |
| KR | 10-2018-0113403 A | 10/2018 |
| KR | 10-2070606 B1 | 1/2020 |
| KR | 10-2020-0075532 A | 6/2020 |
| KR | 10-2021-0048946 A | 5/2021 |
| KR | 10-2266803 B1 | 6/2021 |

OTHER PUBLICATIONS

J. Zou et al., "Increasing the pixel density for VR displays with a polarization grating", Journal of the Society for Information Display, wileyonlinelibrary.com/journal/jsid, DOI: 10.1002/jsid.880, Feb. 27, 2020, (9 pages total).

F. Heide et al., "Cascaded Displays: Spatiotemporal Superresolution using Offset Pixel Layers", NVIDIA Research, Proceedings of SIGGRAPH, 2014, (11 pages total).

J. Hong et al., "See-through optical combiner for augmented reality head-mounted display: index-matched anisotropic crystal lens", Scientific Report, www.nature.com/scientificreports, DOI: 10.1038/s41598-017-03117-w, Jun. 5, 2017, (11 pages total).

J. Marin-Saez et al., "Characterization of volume holographic optical elements recorded in Bayfol HX photopolymer for solar photovoltaic applications", Optical Society of America, vol. 24, No. 6, DOI:10.1364/OE.24.00A720, Mar. 2016, (11 pages total).

K. Wakunami et al., "Projection-type see-through holographic three-dimensional display", Nature Communications, www.nature.com/naturecommunications, DOI: 10.1038/ncomms12954, Oct. 3, 2016, (7 pages total).

A. Sullivan et al., "Holographic analysis of photopolymers", Proceedings of SPIE, vol. 10233, SPIEDigitalLibrary.org/conference-proceedings-of-spie, 2017, (9 pages total).

G. Li et al., "Holographic display for see-through augmented reality using mirror-lens holographic optical element", Optics Letters, vol. 41, No. 11, Jun. 1, 2016, (4 pages total).

International Search Report and Written Opinion dated Mar. 24, 2023, issued by the International Searching Authority in International Application No. PCT/KR2022/020957 (PCT/ISA/220, PCT/ISA/210, and PCT/ISA/237).

Communication dated Feb. 13, 2025, issued by European Patent Office in European Patent Application No. 22911923.5.

* cited by examiner

IMAGE DISTORTION

PROJECTOR AND DISPLAY APPARATUS EMPLOYING HOLOGRAPHIC OPTICAL ELEMENT

CROSS-REFERENCE TO RELATED APPLICATIONS

This application is a continuation application of International Application No. PCT/KR2022/020957, filed on Dec. 21, 2022, which is based on and claims priority to Korean Patent Application No. 10-2021-0187768, filed on Dec. 24, 2021, in the Korean Intellectual Property Office, and Korean Patent Application No. 10-2022-0030320, filed on Mar. 10, 2022, in the Korean Intellectual Property Office, the disclosures of which are incorporated by reference herein in their entireties.

BACKGROUND

1. Field

The disclosure relates to a projector and a display apparatus using a holographic optical element.

2. Description of Related Art

A micro display panel using a micro light-emitting diode (LED) element may be used in an ultra-small projector by using self-emission characteristics of a micro LED element, or may be used to provide a virtual image to a display apparatus, such as a head-mounted display (HMD) for augmented reality (AR)/virtual reality (VR).

A holographic optical element (HOE) has high diffraction efficiency, narrow band wavelength characteristics, and characteristics of being able to implement several functions with one element, and thus, is used as a coupling element in an AR device such as an HMD or used in a screen for a two-dimensional (2D)/three-dimensional (3D) display.

SUMMARY

According to an aspect of the disclosure, a projector includes: a first display panel configured to emit a first beam corresponding to a first image; a second display panel configured to emit a second beam corresponding to a second image; a first transmissive holographic optical element configured to separate the first beam into a first diffracted beam and a second diffracted beam and transmit the first diffracted beam and the second diffracted beam, such that pixels corresponding to the first diffracted beam and pixels corresponding to the second diffracted beam are shifted by a first distance to overlap each other, the first distance being shorter than a length of one pixel; a second transmissive holographic optical element configured to separate the second beam into a third diffracted beam and a fourth diffracted beam and transmit the third diffracted beam and the fourth diffracted beam, such that pixels corresponding to the third diffracted beam and pixels corresponding to the fourth diffracted beam are shifted by a second distance to overlap each other, the second distance being shorter than a length of one pixel; a reflective holographic optical element configured to transmit the first diffracted beam and the second diffracted beam, and diffract and reflect the third diffracted beam and the fourth diffracted beam in a same direction as the first diffracted beam and the second diffracted beam, such that the first image and the second image at least partially overlap each other; and a projection lens configured to project a beam corresponding to an overlapping image created by at least partially overlapping the first image and the second image with each other.

The first transmissive holographic optical element may include: a first holographic diffractive layer configured to diffract the first beam into the first diffracted beam and the second diffracted beam; and a second holographic diffractive layer configured to diffract and transmit the first diffracted beam and the second diffracted beam in a same direction with the first distance therebetween, and wherein the second transmissive holographic optical element may include: a third holographic diffractive layer configured to diffract the second beam into the third diffracted beam and the fourth diffracted beam; and a fourth holographic diffractive layer configured to diffract and transmit the third diffracted beam and the fourth diffracted beam in a same direction with the second distance therebetween.

The first diffracted beam may be a zero-order diffracted beam of the first beam diffracted through the first holographic diffractive layer, the second diffracted beam may be a first-order diffracted beam of the first beam diffracted through the first holographic diffractive layer, the third diffracted beam may be a zero-order diffracted beam of the second beam diffracted through the third holographic diffractive layer, and the fourth diffracted beam may be a first-order diffracted beam of the second beam diffracted through the fourth holographic diffractive layer.

A thickness (T) of the first transmissive holographic optical element may satisfy $d=|T(\tan\theta\_1-\tan\theta\_2)|$, where $\theta 1$ is a diffraction angle of the first diffracted beam of the first holographic diffractive layer, $\theta 2$ is a diffraction angle of the second diffracted beam of the first holographic diffractive layer, and d is the first distance.

The first distance is a/n, where a is the length of the one pixel in a certain direction, and n is an integer.

The first distance and the second distance are equal to each other.

The first distance and the second distance are a/2, where a is a diagonal length of the one pixel, and the reflective holographic optical element is configured such that, based on pixels corresponding to each other, a pixel corresponding to the third diffracted beam is shifted by a distance of a/4 in a diagonal direction with respect to a pixel corresponding to the first diffracted beam to overlap the pixel corresponding to the first diffracted beam.

The first distance and the second distance are a/4, where a is a diagonal length of the one pixel, and the reflective holographic optical element is configured such that, based on pixels corresponding to each other, a pixel corresponding to the third diffracted beam is shifted by a distance of a/2 in a diagonal direction with respect to a pixel corresponding to the first diffracted beam to overlap the pixel corresponding to the first diffracted beam.

The first transmissive holographic optical element may be configured such that a quantity of light of the first diffracted beam and a quantity of light of the second diffracted beam are substantially equal to each other, and the second transmissive holographic optical element may be configured such that a quantity of light of the third diffracted beam and a quantity of light of the fourth diffracted beam are substantially equal to each other.

The first transmissive holographic optical element and the reflective holographic optical element may contact each other.

The projector may further include: a third display panel configured to emit a third beam corresponding to a third image; a third holographic optical element configured to separate the third beam into a fifth diffracted beam and a sixth diffracted beam and transmit the fifth diffracted beam and the sixth diffracted beam, such that pixels corresponding to the fifth diffracted beam and pixels corresponding to the sixth diffracted beam are shifted by a third distance to overlap each other, the third distance be shorter than t length of one pixel; and a second reflective holographic optical element configured to transmit the first diffracted beam, the second diffracted beam, the third diffracted beam, and the fourth diffracted beam, and diffract and reflect the fifth diffracted beam and the sixth diffracted beam in a same direction as the first diffracted beam, the second diffracted beam, the third diffracted beam, and the fourth diffracted beam, such that pixels of the first image, pixels of the second image, and pixels of the third image at least partially overlap each other.

The reflective holographic optical element and the second reflective holographic optical element may be arranged apart from each other, and the second reflective holographic optical element is disposed outside a path of the second beam, between the second transmissive holographic optical element and the reflective holographic optical element.

The reflective holographic optical element and the second reflective holographic optical element may contact each other.

The projector may further include a correction holographic optical element disposed between the second display panel and the reflective holographic optical element, and configured to correct distortion of the third diffracted beam and the fourth diffracted beam caused by diffraction and reflection by the reflective holographic optical element.

According to an aspect of the disclosure, a display apparatus includes: a projector; and an image combiner configured to guide a beam emitted from the projector to a target area, wherein the target area is an eye motion box of a user, and the projector includes: a first display panel configured to emit a first beam corresponding to a first image; a second display panel configured to emit a second beam corresponding to a second image; a first transmissive holographic optical element configured to separate the first beam into a first diffracted beam and a second diffracted beam and transmit the first diffracted beam and the second diffracted beam, such that pixels corresponding to the first diffracted beam and pixels corresponding to the second diffracted beam are shifted by a first distance to overlap each other, the first distance being shorter than a length of one pixel; a second transmissive holographic optical element configured to separate the second beam into a third diffracted beam and a fourth diffracted beam and transmit the third diffracted beam and the fourth diffracted beam, such that pixels corresponding to the third diffracted beam and pixels corresponding to the fourth diffracted beam are shifted by a second distance to overlap each other, the second distance being shorter than a length of one pixel; a reflective holographic optical element configured to transmit the first diffracted beam and the second diffracted beam, and diffract and reflect the third diffracted beam and the fourth diffracted beam in a same direction as the first diffracted beam and the second diffracted beam, such that the first image and the second image at least partially overlap each other; and a projection lens configured to project a beam corresponding to an overlapping image created by at least partially overlapping the first image and the second image with each other.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
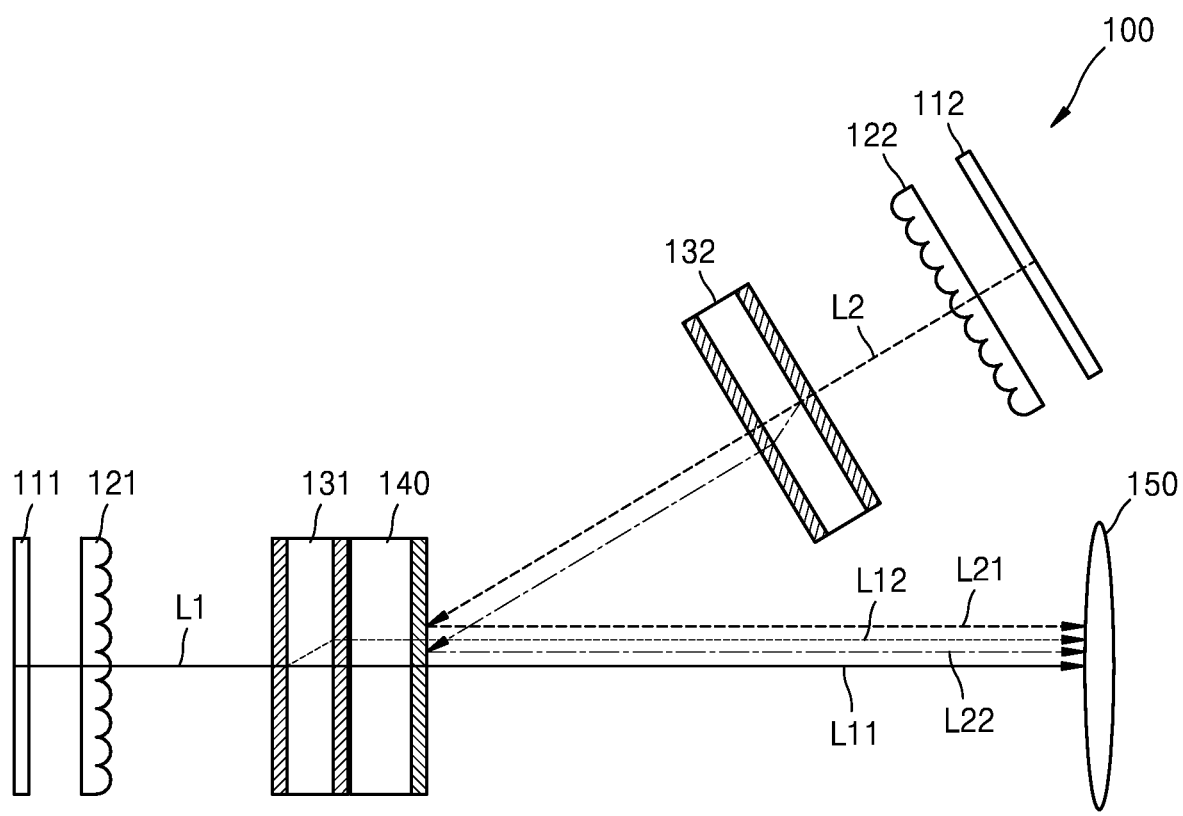
FIG. 1 schematically illustrates an optical system of a projector according to an embodiment of the disclosure.

Throughout the disclosure, the expression "at least one of a, b or c" indicates only a, only b, only c, both a and b, both a and c, both b and c, or all of a, b, and c.

Hereinafter, embodiments of the disclosure will be described in detail with reference to the accompanying drawings to allow those of ordinary skill in the art to easily carry out the embodiments of the disclosure. However, the disclosure may be implemented in various forms, and are not limited to the embodiment of the disclosure described herein. To clearly describe the disclosure, parts that are not associated with the description have been omitted from the drawings, identical reference numerals refer to identical parts throughout the specification, and in the drawings, the size of each component may be exaggerated for clarity and convenience of description.

Although terms used in an embodiment of the specification are selected with general terms popularly used at present under the consideration of functions in the disclosure, the terms may vary according to the intention of those of ordinary skill in the art, judicial precedents, or introduction of new technology. In addition, in a specific case, the applicant voluntarily may select terms, and in this case, the meaning of the terms is disclosed in a corresponding description part of the disclosure. Thus, the terms used in the specification should be defined not by the simple names of the terms but by the meaning of the terms and the contents throughout the disclosure.

The singular expression includes the plural expression unless the context clearly dictates otherwise. Also, when a part "includes" a certain component, it means that the part may further include other components, rather than excluding other components, unless otherwise stated.

Hereinafter, the disclosure will be described in detail with reference to the accompanying drawings.

A micro light-emitting diode (LED) element has excellent characteristics, that is, relatively high luminance and low power consumption, but the brightness of a micro display panel is still insufficient to be used in ultra-small projectors or head-mounted displays (HMDs). When an emission area of the micro LED element is increased to solve the problem, another problem in which the resolution (that is, pixels per inch (PPI)) decreases in the same panel area may occur.

One or more embodiments of the disclosure provide an optical system that may be capable of simultaneously increasing the brightness and resolution of a projector.

In addition, one or more embodiments provide an optical system that may be capable of simultaneously increasing the brightness and resolution of a display apparatus.

The technical features of the disclosure are not limited to the aforementioned technical features, and other unstated technical features may be inferred from embodiments of the disclosure below.

FIG. 1 schematically illustrates an optical system of a projector 100 according to an embodiment of the disclosure.

Referring to FIG. 1, the projector 100 includes a first display panel 111, a second display panel 112, a first transmissive holographic optical element (HOE) 131, a second transmissive HOE 132, a reflective HOE 140, and a projection lens 150.

The first display panel 111 emits a first beam L1 corresponding to a first image. The first image may include rows and columns of first pixels.

The second display panel 112 emits a second beam L2 corresponding to a second image. The second image may include rows and columns of second pixels. The first image and the second image may be the same image, but may have different pixel color information. As described below, the first and second images may be determined such that pixel color information of an overlapping image formed by the optical system of the present embodiment of the disclosure is similar to pixel color information of a target image as much as possible.

In an embodiment of the disclosure, each of the first and second display panels 111 and 112 may be, but is not limited to, a self-emissive display panel emitting light autonomously.

In an embodiment of the disclosure, each of the first and second display panels 111 and 112 may be a micro light-emitting display panel. The micro light-emitting display panel may be a panel in which LEDs form a pixel array.

In an embodiment of the disclosure, each of the first and second display panels 111 and 112 may be an organic light-emitting display panel.

In an embodiment of the disclosure, each of the first and second display panels 111 and 112 may be a monochrome display panel for displaying a monochrome image. Herein, "monochrome" may mean a primary color such as red, green, or blue, or other single colors, as well as black and white having only simple contrast.

A first collimating lens 121 for collimating, into a parallel beam, the first beam L1 emitted from the first display panel 111 may be provided on a front surface of the first display panel 111. Likewise, a second collimating lens 122 for collimating, into a parallel beam, the second beam L2 emitted from the second display panel 112 may be provided on a front surface of the second display panel 112. Each of the first and second collimating lenses 121 and 122 may be, but is not limited to, a micro lens array.

The first transmissive HOE 131 is arranged on the front surface of the first display panel 111. The first collimating lens 121 may be arranged between the first display panel 111 and the first transmissive HOE 131. The first transmissive HOE 131 may be arranged such that the first beam L1 is vertically incident on an incident surface of the first transmissive HOE 131, but the disclosure is not limited thereto.

The first transmissive HOE 131 separates the first beam L1 into a first diffracted beam L11 and a second diffracted beam L12 and transmits the first and second diffracted beams L11 and L12 such that pixels corresponding to the first diffracted beam L11 and pixels corresponding to the second diffracted beam L12 are shifted by a first distance shorter than a length of one pixel in a certain direction to overlap each other. Herein, one pixel in the certain direction may be, but is not limited to, one pixel in a diagonal direction, a column direction, or a row direction. The length of one pixel in the certain direction may be the maximum length among lengths of one pixel in the certain direction. For example, when the certain direction is a diagonal direction, the length of one pixel in the certain direction may mean a diagonal length of one pixel.

In an embodiment of the disclosure, pixels corresponding to the first diffracted beam L11 and pixels corresponding to the second diffracted beam L12 may be shifted by a distance shorter than a diagonal length of one pixel in a diagonal direction by the first transmissive HOE 131 to overlap each other.

The second transmissive HOE 132 is arranged on the front surface of the second display panel 112. The second collimating lens 122 may be arranged between the second display panel 112 and the second transmissive HOE 132. The second transmissive HOE 132 may be arranged such that the second beam L2 is vertically incident on an incident surface of the second transmissive HOE 132, but the disclosure is not limited thereto.

The second transmissive HOE 132 separates the second beam L2 into a third diffracted beam L21 and a fourth diffracted beam L22 and transmits the third and fourth diffracted beams L21 and L22 such that pixels corresponding to the third diffracted beam L21 and pixels corresponding to the fourth diffracted beam L22 are shifted by a second distance shorter than a length of one pixel in a certain direction to overlap each other. The second distance by which the third and fourth diffracted beams L21 and L22 are shifted may be equal to the first distance by which the first and second diffracted beams L11 and L12 are shifted, but embodiments of the disclosure are not limited thereto.

In an embodiment of the disclosure, pixels corresponding to the third diffracted beam L21 and pixels corresponding to the fourth diffracted beam L22 may be shifted by a distance shorter than a diagonal length of one pixel in a diagonal direction by the second transmissive HOE 132 to overlap each other.

Figure 2:
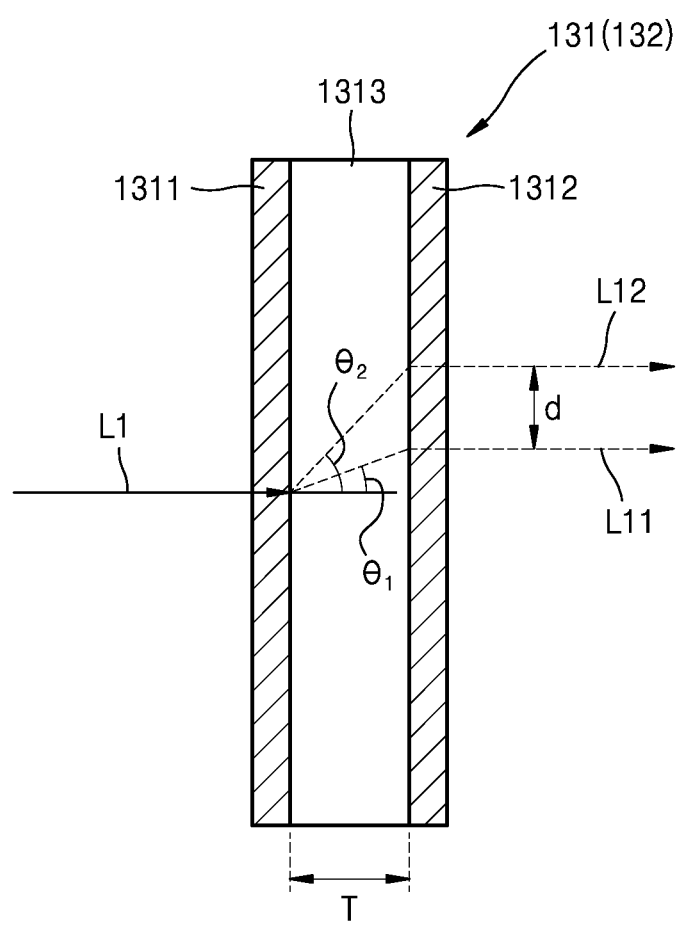
FIG. 2 schematically illustrates a first transmissive holographic optical element (HOE) according to an embodiment of the disclosure.

FIG. 2 schematically illustrates the first transmissive HOE 131 according to an embodiment of the disclosure. Referring to FIG. 2, the first transmissive HOE 131 may include a first holographic diffractive layer 1311 and a second holographic diffractive layer 1313.

The first holographic diffractive layer 1311 allows the incident first beam L1 to be diffracted into and transmitted as the first diffracted beam L11 and the second diffracted beam L12. The first diffracted beam L11 and the second diffracted beam L12 may be diffracted beams of different orders, which are diffracted through the first holographic diffractive layer 1311. In an embodiment of the disclosure, the first diffracted beam L11 may be zero-order diffracted through the first holographic diffractive layer 1311, and the second diffracted beam L12 may be first-order diffracted through the first holographic diffractive layer 1311, but embodiments of the disclosure are not limited thereto.

The second holographic diffractive layer 1313 allows the first and second diffracted beams L11 and L12 formed by being diffracted through the first holographic diffractive layer 1311 to be diffracted again and transmitted in the same direction. In an embodiment of the disclosure, the first and second diffracted beams L11 and L12 may be diffracted again by the second holographic diffractive layer 1313 and emitted perpendicular to an exit surface of the second holographic diffractive layer 1313, but the disclosure is not limited thereto.

The first transmissive HOE 131 may be configured such that the quantity of light of the first diffracted beam L11 and the quantity of the light of the second diffracted beam L12 are substantially equal to each other.

In an embodiment of the disclosure, the first holographic diffractive layer 1311 may be configured such that, in the diffraction of the first beam L1, diffraction efficiency for a diffraction order of the first diffracted beam L11 and diffraction efficiency for a diffraction order of the second diffracted beam L12 are substantially equal to each other, for example, may be configured such that each of the diffraction efficiencies is approximately 50%. For example, the first holographic diffractive layer 1311 may be configured such that, in the diffraction of the first beam L1, each of diffraction efficiency for a zero-order diffraction order and diffraction efficiency for a first-order diffraction order is approximate to 50%, and accordingly, the first beam L1 may be separated into the first diffracted beam L11 and the second diffracted beam L12 with almost no loss of the quantity of light.

In an embodiment of the disclosure, the second holographic diffractive layer 1313 may diffract the first and second diffracted beams L11 and L12 in the same direction, and may be configured such that diffraction efficiency of the first diffracted beam L11 and diffraction efficiency of the second diffracted beam L12 are substantially equal to each other, for example, may be configured such that the first and second diffracted beams L11 and L12 are diffracted with almost no loss of the quantity of light (for example, with diffraction efficiencies of about 90% or more).

As described above, the first transmissive HOE 131 may separate the first beam L1 into the first diffracted beam L11 and the second diffracted beam L12 with almost no loss of the quantity of light and allow the first diffracted beam L11 and the second diffracted beam L12 to travel in the same direction.

In an embodiment of the disclosure, a transparent member 1312 may be provided to support the first holographic diffractive layer 1311 and the second holographic diffractive layer 1313. The transparent member 1312 may include a material that is transparent with respect to a wavelength band of the first beam L1.

In an embodiment of the disclosure, the transparent member 1312 may be arranged between the first holographic diffractive layer 1311 and the second holographic diffractive layer 1313.

In an embodiment of the disclosure, in a case where the first diffracted beam L11 is diffracted at a diffraction angle $\theta_1$ by the first holographic diffractive layer 1311, and the second diffracted beam L12 is diffracted at a diffraction angle $\theta_2$ by the first holographic diffractive layer 1311, a first distance d between the first diffracted beam L11 and the second diffracted beam L12 and a thickness T of the first transmissive HOE 131 may satisfy the following Equation.

$$d=|T(\tan\theta_1-\tan\theta_2)| \qquad \text{[Equation 1]}$$

Herein, the thickness T of the first transmissive HOE 131 may be understood as a distance between the first holographic diffractive layer 1311 and the second holographic diffractive layer 1313. In other words, the first and second diffracted beams L11 and L12 formed by being diffracted through the first holographic diffractive layer 1311 may be apart from each other by the first distance d by passing through the transparent member 1312.

In an embodiment of the disclosure, the first holographic diffractive layer 1311 and the second holographic diffractive layer 1313 may be in contact with each other, and the transparent member 1312 may be attached to and support the incident surface of the first holographic diffractive layer 1311. In this case, the thickness T of the first transmissive HOE 131 may be understood as a thickness of the first holographic diffractive layer 1311.

In an embodiment of the disclosure, the first holographic diffractive layer 1311 and the second holographic diffractive layer 1313 may be in contact with each other, and the transparent member 1312 may be attached to and support the exit surface of the second holographic diffractive layer 1313. In this case, the thickness T of the first transmissive HOE 131 may be understood as a thickness of the first holographic diffractive layer 1311.

The second transmissive HOE 132 may also include a third holographic diffractive layer through which the second beam L2 is diffracted into and transmitted as the third diffracted beam L21 and the fourth diffracted beam L22, and a fourth holographic diffractive layer through which the third diffracted beam L21 and the fourth diffracted beam L22 are diffracted and transmitted in the same direction with the second distance therebetween. The second transmissive HOE 132 may have substantially the same structure as the first transmissive HOE 131 described with reference to FIG. 2, and thus redundant descriptions are omitted.

Referring back to FIG. 1, the reflective HOE 140 combines the first and second diffracted beams L11 and L12 of the first image and the third and fourth diffracted beams L21 and L22 of the second image together such that pixels of the first image and pixels of the second image at least partially overlap each other.

The reflective HOE 140 may be arranged to be adjacent to an exit surface of the first transmissive HOE 131. In an embodiment of the disclosure, the reflective HOE 140 may be arranged to be in contact with the first transmissive HOE 131. In an embodiment of the disclosure, the reflective HOE 140 and the first transmissive HOE 131 may be bonded together to form an integral optical element.

The reflective HOE 140 may be arranged to obliquely face the second transmissive HOE 132. A separate optical element (for example, a correction element or a reflective member) may be arranged between the reflective HOE 140 and the second transmissive HOE 132.

Figure 3:
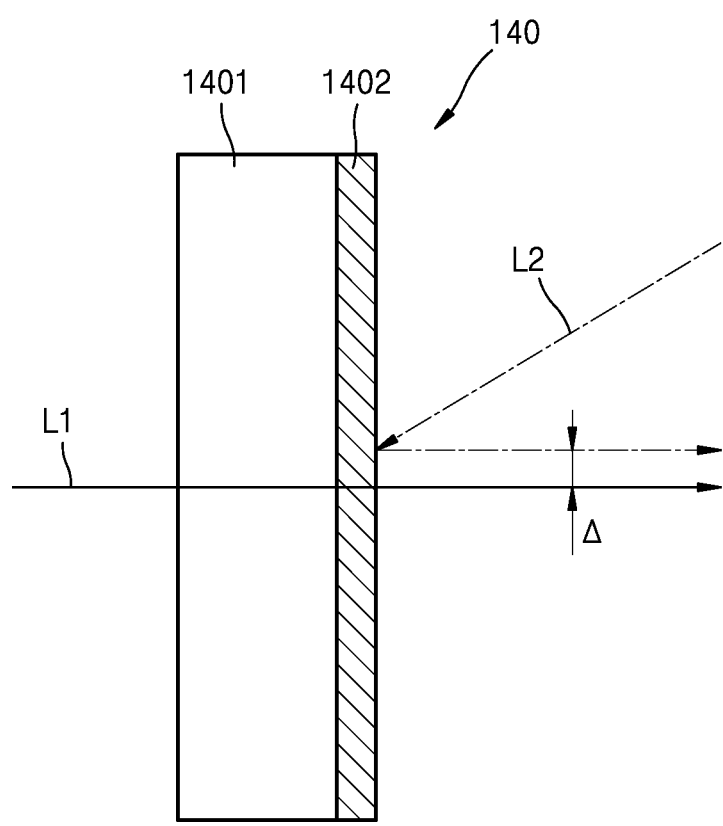
FIG. 3 schematically illustrates a reflective HOE according to an embodiment of the disclosure.

FIG. 3 schematically illustrates the reflective HOE 140 according to an embodiment of the disclosure. Referring to FIG. 3, the reflective HOE 140 may include a transparent body 1401 and a reflective holographic diffractive layer 1402 attached to the transparent body 1401. When the reflective holographic diffractive layer 1402 is directly attached to the first transmissive HOE 131, the transparent body 1401 may be omitted. The transparent body 1401 and the reflective holographic diffractive layer 1402 transmit the first and second diffracted beams L11 and L12 of the first image, which are diffracted and transmitted by the first transmissive HOE 131.

The reflective holographic diffractive layer 1402 may diffract and transmit an incident beam with almost no loss of the quantity of light (for example, with a diffraction efficiency of about 90% or more), and may transmit a beam incident on a rear surface (that is, an opposite surface to a diffractive-reflective surface) with almost no loss of the quantity of light (for example, with a diffraction efficiency of about 90% or more). For example, in an embodiment of the disclosure, the reflective holographic diffractive layer 1402 may diffract and reflect an incident beam to have a diffraction efficiency of about 90% or more with respect to a specific diffraction order (for example, first-order diffraction), and may transmit a beam incident on a rear surface to have an efficiency of about 90% or more with respect to a specific diffraction order (for example, zero-order diffraction). Accordingly, the first and second diffracted beams L11 and L12 of the first image, which are incident on the rear surface of the reflective holographic diffractive layer 1402, may not substantially be diffracted (in other words, may be zero-order diffracted) and may be transmitted with negligible loss of the quantity of light, and third and fourth diffracted beams L3 and L4 incident on the reflective holographic diffractive layer 1402 may be diffracted in a specific diffraction order (for example, a first order) and reflected with negligible loss of the quantity of light, thereby traveling in the same direction as the first and second diffracted beams L11 and L12.

In the reflective HOE 140, a distance A between the reflected third and fourth diffracted beams L3 and L4 and the transmitted first and second diffracted beams L11 and L12 may be greater than or equal to 0 and may be smaller than a length of one pixel in a certain direction. In an embodiment of the disclosure, when the distance A is 0, pixels of the first and second diffracted beams L11 and L12 and pixels of the third and fourth diffracted beams L3 and L4 are completely overlapped with each other by the reflective HOE 140, and when the distance A is greater than 0 and smaller than a length of one pixel in a certain direction, the pixels of the first and second diffracted beams L11 and L12 and the pixels of the third and fourth diffracted beams L3 and L4 are partially overlapped with each other by the reflective HOE 140.

The projection lens 150 projects a beam of an overlapping image that is created by a partial overlap by the reflective HOE 140. The projection lens 150 may include a single lens or a plurality of lenses.

Next, referring to FIGS. 4 to 7, a method of forming an overlapping image of a projector, according to an embodiment of the disclosure, will be described in detail.

Figure 4:
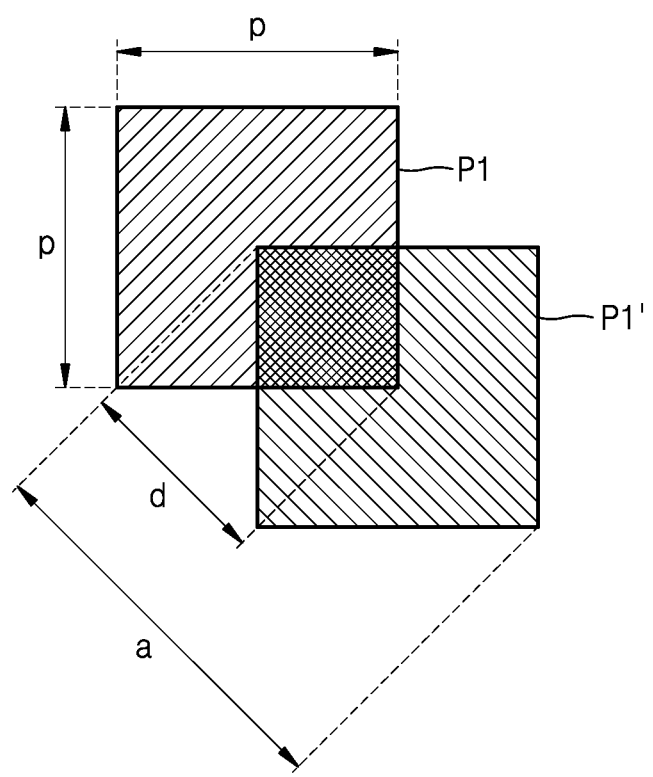
FIG. 4 illustrates pixels partially overlapping each other, according to an embodiment of the disclosure.

FIG. 4 illustrates pixels partially overlapping each other, according to an embodiment of the disclosure.

Referring to FIG. 4, the first transmissive HOE 131 may shift the first diffracted beam L11 and the second diffracted beam L12 of the first beam L1 by the first distance d in a diagonal direction of one pixel such that a first pixel P1 corresponding to the first diffracted beam L11 and a second pixel P1' corresponding to the second diffracted beam L12 partially overlap each other. In this regard, the first distance d may satisfy the following Equation 2.

$$0 < d < a \qquad \text{[Equation 2]}$$

Herein, a may be a length of a diagonal line of a pixel. For example, for a square pixel of which a width and a length are each p, a is p√2.

For example, an example shown in FIG. 4 is a case where d is a/2, and the second pixel P1' is shifted from the first pixel P1 by a/2 (p√2/2 in the case of a square) in a diagonal direction. The first pixel P1 may be shifted from the second pixel P1'. As a result, the first pixel P1 and the second pixel P1' overlap each other by ¼, based on area.

Referring to FIGS. 2 and 3, in an embodiment of the disclosure, a thickness of the first transmissive HOE 131 may be 30 μm, the diffraction angle θ1 of the first diffracted beam L11 may be 0° (deg), the diffraction angle $\theta_2$ of the second diffracted beam L12 may be 0.5° (deg), and thus, the first distance d may be 5 μm. Therefore, when a pixel size is 7 μm*7 μm, the first pixel P1 and the second pixel P1' may partially overlap each other by ½ of a diagonal line in a diagonal direction.

Figure 5:
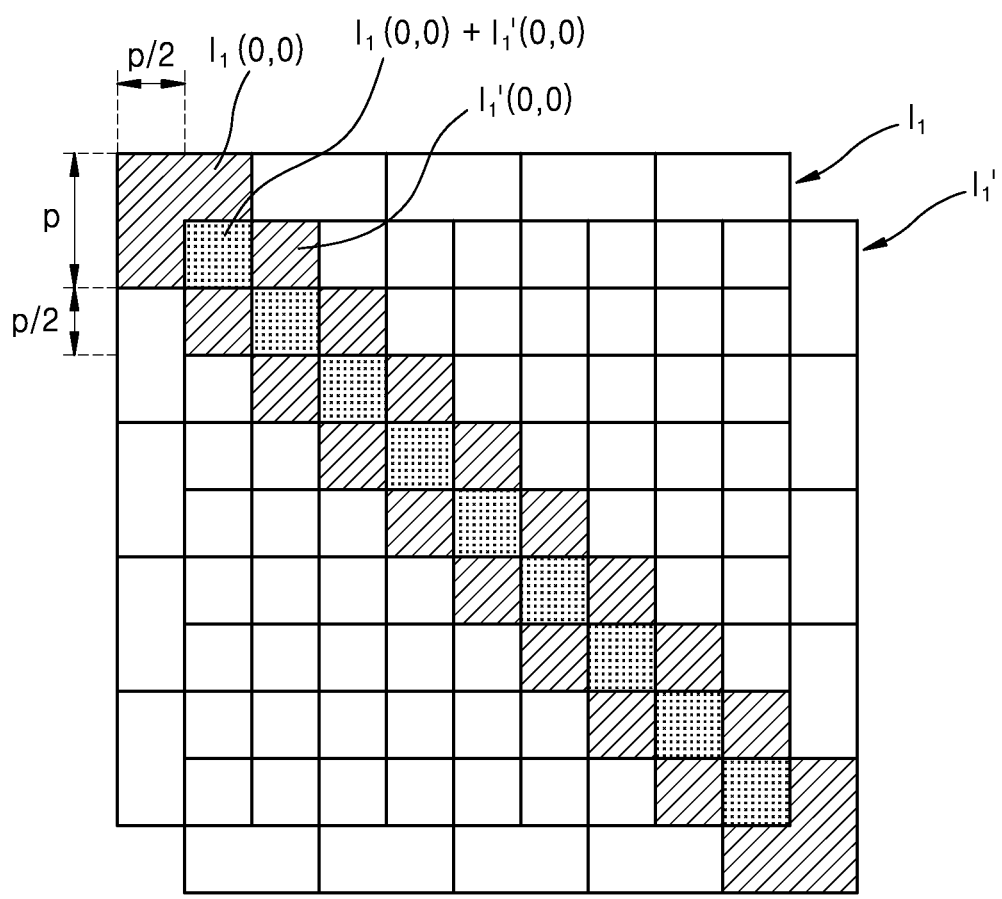
FIG. 5 schematically illustrates that pixels of a first image are partially overlapped by a first transmissive HOE, according to an embodiment of the disclosure.
Figure 6:
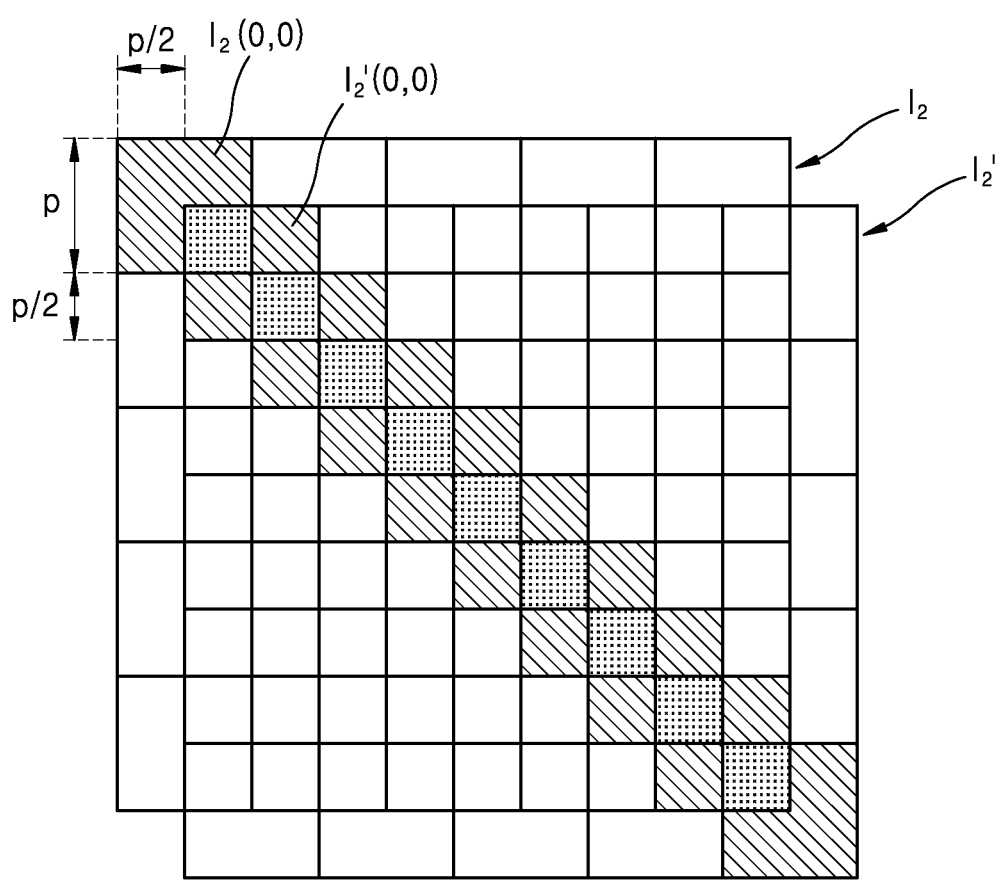
FIG. 6 schematically illustrates that pixels of a second image are partially overlapped by a second transmissive HOE, according to an embodiment of the disclosure.
Figure 7:
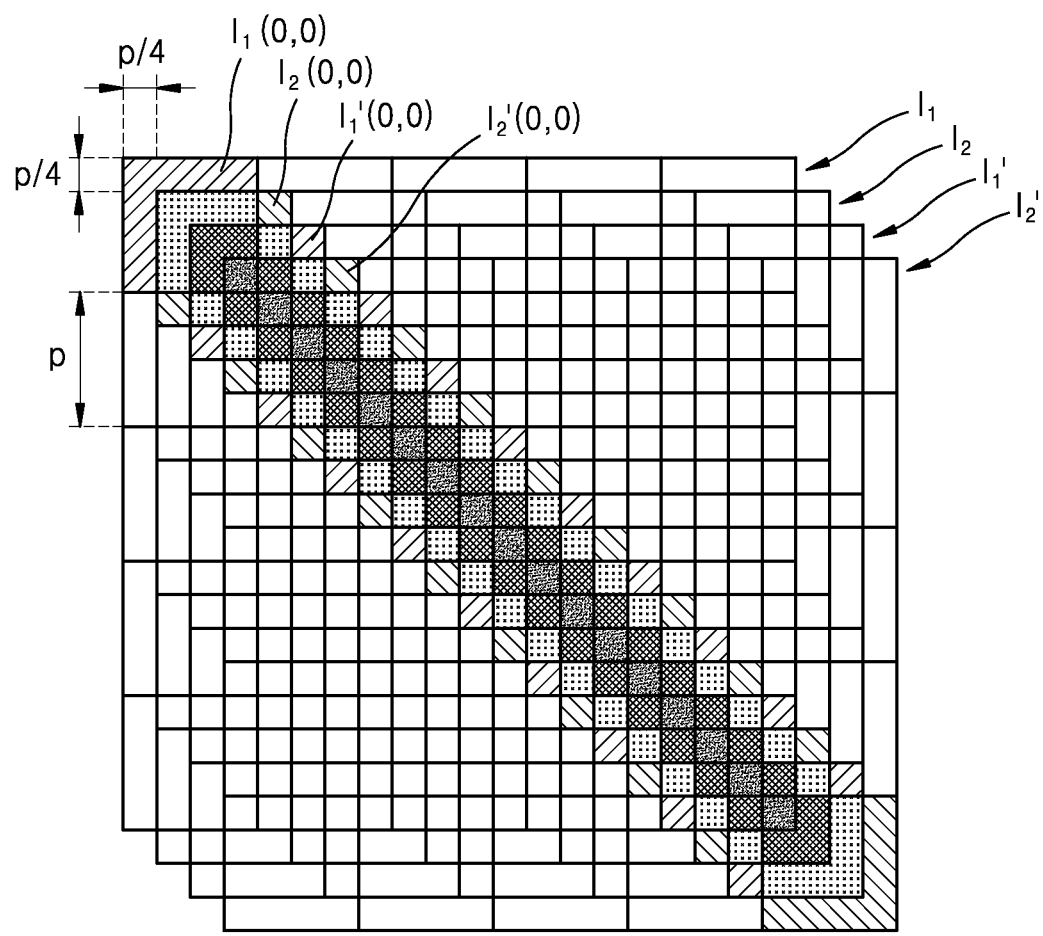
FIG. 7 schematically illustrates that a first sub-overlapping image and a second sub-overlapping image are partially overlapped with each other by a reflective HOE, according to an embodiment of the disclosure.

FIG. 5 schematically illustrates that pixels of the first image are partially overlapped by the first transmissive HOE 131, according to an embodiment of the disclosure, FIG. 6 schematically illustrates that pixels of the second image are partially overlapped by the second transmissive HOE 132, according to an embodiment of the disclosure, and FIG. 7 schematically illustrates that a first sub-overlapping image and a second sub-overlapping image are partially overlapped with each other by the reflective HOE 140, according to an embodiment of the disclosure.

Referring to FIG. 5, pixels corresponding to each other in a first diffraction image $I_1$ by the first diffracted beam L11 of the first beam L1 and a second diffraction image $I_1'$ by the second diffracted beam L12 of the first beam L1 partially overlap each other to form the first sub-overlapping image. The first and second diffraction images $I_1$ and $I_1'$ are the same image, for example, an image displaying a diagonal line. The first and second diffraction images $I_1$ and $I_1'$ are shifted by p/2 in a row direction and by p/2 in a column direction. In other words, the first diffraction image $I_1$ and the second diffraction image $I_1'$ are shifted by $p\sqrt{2}/2$ in a diagonal direction to overlap each other, and pixels corresponding to each other may overlap each other by ¼ area. An area in which a pixel coordinate (0,0) of the first diffraction image $I_1$ and a pixel coordinate (0,0) of the second diffraction image $I_1'$ overlap each other may have the sum of the respective light intensities (that is, $I_1$ (0.0)+$I_1'$ (0,0)), and thus the brightness may be increased by a factor of up to two. Also, as the corresponding pixels partially overlap each other, a pixel density of the first sub-overlapping image is doubled, and thus an image is displayed with greater detail and becomes clearer.

Referring to FIG. 6, pixels corresponding to each other in a third diffraction image $I_2$ by the third diffracted beam L21 of the second beam L2 and a fourth diffraction image $I_2'$ by the fourth diffracted beam L22 of the second beam L2 partially overlap each other to form the second sub-overlapping image. The third and fourth diffraction images $I_2$ and $I_2'$ are the same image, for example, an image displaying a diagonal line. Pixel color information of the third and fourth diffraction images $I_2$ and $I_2'$ may be different from pixel color information of the first and second diffraction images $I_1$ and $I_1'$. Similarly with the first transmissive HOE 131, the third diffraction image $I_2$ and the fourth diffraction image $I_2'$ may be shifted by $p\sqrt{2}/2$ in a diagonal direction by the second transmissive HOE 132 to overlap each other, pixels corresponding to each other may overlap each other by ¼ area.

Referring to FIG. 7, the reflective HOE 140 combines the first sub-overlapping image and the second sub-overlapping image such that a pixel corresponding to the first sub-overlapping image and a pixel corresponding to the second sub-overlapping image are partially overlap each other to form an overlapping image. In detail, as an example shown in FIG. 7, a pixel (for example, a pixel coordinate (0,0) of the first diffraction image $I_1$) corresponding to the first sub-overlapping image and a pixel (for example, a pixel coordinate (0,0) of the third diffraction image $I_2$) corresponding to the second sub-overlapping image are shifted by p/4 in a row direction and by p/4 in a column direction. In other words, the first sub-overlapping image and the second sub-overlapping image may be shifted by $p\sqrt{2}/4$ in a diagonal direction to overlap each other.

As a result, a pixel density of an overlapping image formed by an overlap of the first diffraction image $I_1$, the second diffraction image $I_1'$, the third diffraction image $I_2$, and the fourth diffraction image $I_2'$ may be quadrupled, and thus an image is displayed with greater detail and becomes clearer, and the brightness may be increased by a factor of up to four.

Figure 8:
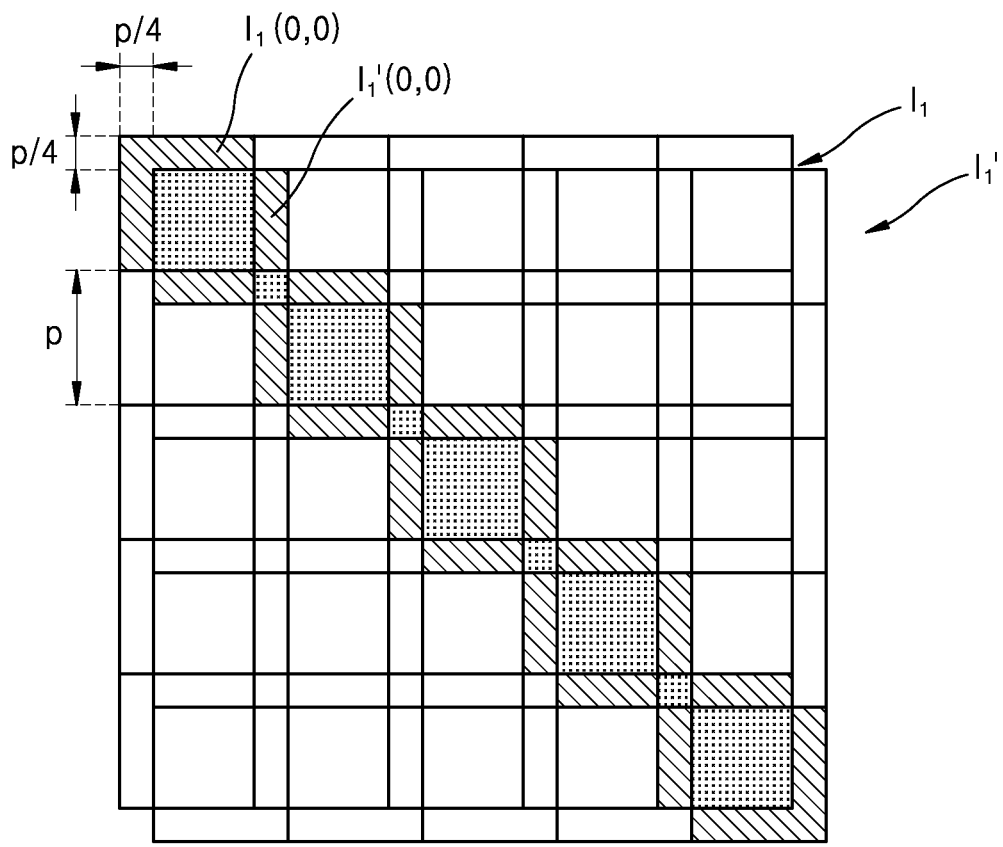
FIG. 8 schematically illustrates that pixels of a first image are partially overlapped by a first transmissive HOE, according to an embodiment of the disclosure.
Figure 9:
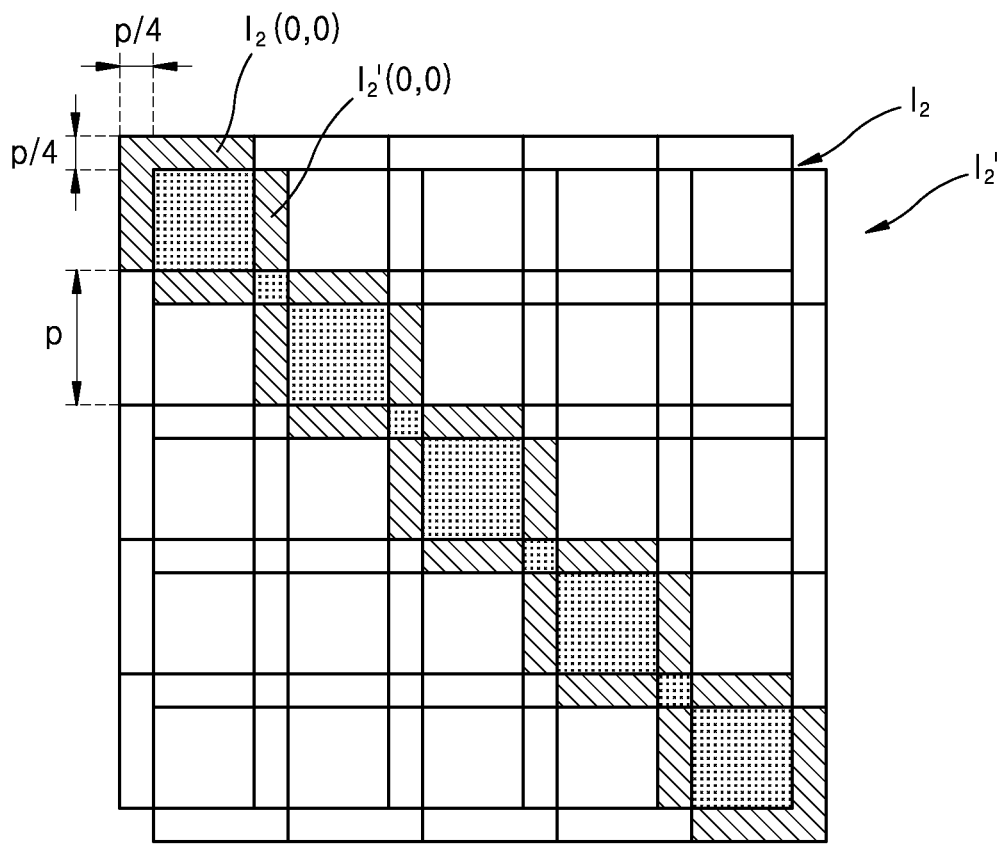
FIG. 9 schematically illustrates that pixels of a second image are partially overlapped by a second transmissive HOE, according to an embodiment of the disclosure.
Figure 10:
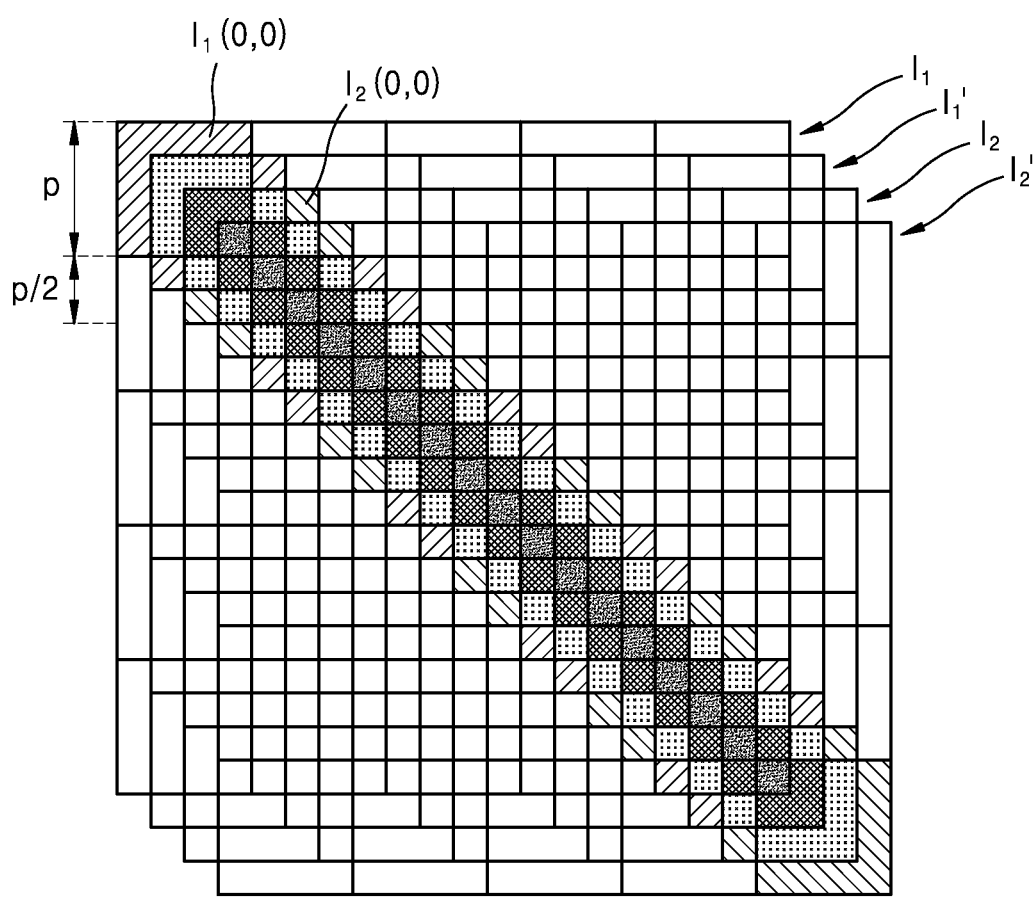
FIG. 10 schematically illustrates that a first sub-overlapping image and a second sub-overlapping image are partially overlapped with each other by a reflective HOE, according to an embodiment of the disclosure.

Referring to FIGS. 8 to 10, a method of forming an overlapping image of a projector, according to an embodiment of the disclosure, will be described.

FIG. 8 schematically illustrates that pixels of the first image are partially overlapped by the first transmissive HOE 131, according to an embodiment of the disclosure, FIG. 9 schematically illustrates that pixels of the second image are partially overlapped by the second transmissive HOE 132, according to an embodiment of the disclosure, and FIG. 10 schematically illustrates that a first sub-overlapping image and a second sub-overlapping image are partially overlapped with each other by the reflective HOE 140, according to an embodiment of the disclosure.

The method of forming the overlapping image described with reference to FIGS. 8 to 10 is substantially the same as the method of forming the overlapping image described with reference to FIGS. 5 to 7, except for a shift size (distance) and a difference in arrangement according to the shift size, and thus differences will be mainly described.

Referring to FIG. 8, the first and second diffraction images $I_1$ and $I_1'$ are shifted by p/4 in a row direction and by p/4 in a column direction to form the first sub-overlapping image. In other words, the first diffraction image $I_1$ and the second diffraction image $I_1'$ are shifted by $p\sqrt{2}/4$ in a diagonal direction to overlap each other, and pixels corresponding to each other may overlap each other by 9/16 area. Likewise, referring to FIG. 9, the third diffraction image $I_2$ and the fourth diffraction image $I_2'$ are shifted by $p\sqrt{2}/4$ in a diagonal direction to overlap each other to form the second sub-overlapping image, pixels corresponding to each other may overlap each other by 9/16 area.

Referring to FIG. 10, the first and second sub-overlapping images are shifted by p/2 in a row direction and by p/2 in a column direction to form the overlapping image. In other words, a pixel (for example, a pixel coordinate (0,0) of the first diffraction image $I_1$) corresponding to the first sub-overlapping image and a pixel (for example, a pixel coordinate (0,0) of the third diffraction image $I_2$) corresponding to the second sub-overlapping image are shifted by p/2 in a row direction and by p/2 in a column direction. In other words, the first sub-overlapping image and the second sub-overlapping image are shifted by $p\sqrt{2}/2$ in a diagonal direction to form the overlapping image.

As a result, a pixel density of an overlapping image formed by an overlap of the first diffraction image $I_1$, the second diffraction image $I_1'$, the third diffraction image $I_2$, and the fourth diffraction image $I_2'$ may be quadrupled, and thus an image is displayed with greater detail and becomes clearer, and the brightness may be increased by a factor of up to four.

Although the methods of forming the overlapping image of the projector described with reference to FIGS. 4 to 10 are described by using, as an example, a case where pixels are shifted in a diagonal direction of one pixel, the pixels may be shifted in another direction.

Figure 11:
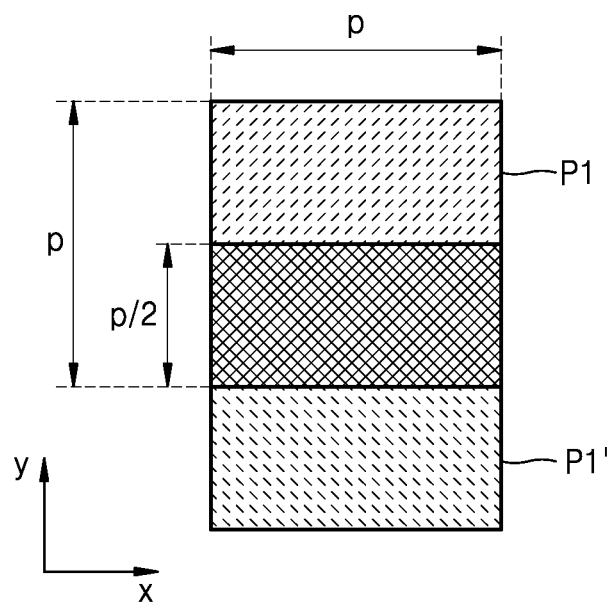
FIG. 11 illustrates pixels partially overlapping each other, according to an embodiment of the disclosure.

FIG. 11 illustrates pixels partially overlapping each other, according to an embodiment of the disclosure. Referring to FIG. 11, the first pixel P1 corresponding to the first diffracted beam L11 and the second pixel P1' corresponding to the second diffracted beam L12 may be shifted by a first distance (for example, p/2) in a column direction (a y-axis direction) of one pixel to partially overlap each other.

The shift in the column direction (the y-axis direction) shown in FIG. 11 is exemplary, and for example, the shift may also be carried out in a row direction (an x-axis direction) or another direction.

Figure 12:
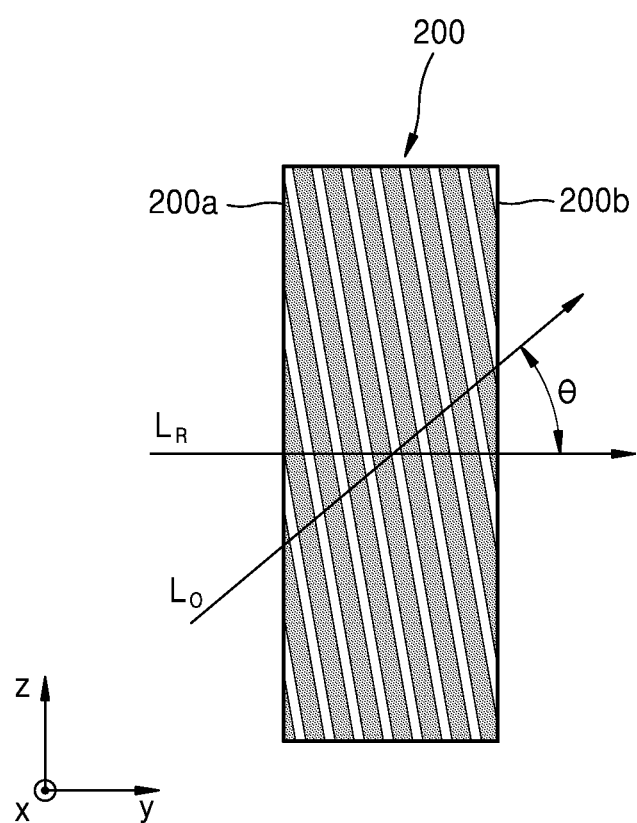
FIG. 12 is a diagram illustrating an example of manufacturing a transmissive HOE, according to an embodiment of the disclosure.

FIG. 12 is a diagram illustrating an example of manufacturing a transmissive HOE, according to an embodiment of the disclosure. Referring to FIG. 12, a holographic diffractive layer of the transmissive HOE may be manufactured by radiating an object beam $L_O$ and a reference beam $L_R$ on a first surface 200a of a transparent photosensitive material 200, such as photo polymer, light refractive glass, or the like, to cross each other with an angle θ therebetween. The object beam $L_O$ and the reference beam $L_R$ are coherent beams having the same wavelength, and cause reinforcement and interference in the transparent photosensitive material 200 to form a refractive index change pattern of an interference fringe. When a beam of the same wavelength and in the same direction as the reference beam $L_R$ is radiated on the first surface 200a of the transparent photosensitive material 200 manufactured as above, the beam is diffracted at the angle θ and transmitted outside a second surface 200b opposite to the first surface 200a of the transparent photosensitive material 200. The holographic diffractive layer may be manufactured to meet diffraction characteristics requested from the first and second transmissive HOEs 131 and 132 according to the intensity and number of the radiated object beam $L_O$ and the radiated reference beam $L_R$.

Figure 13:
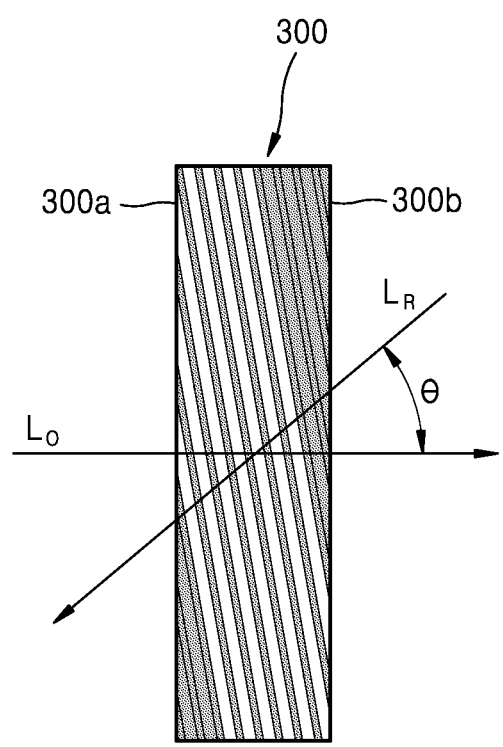
FIG. 13 is a diagram illustrating an example of manufacturing a reflective HOE, according to an embodiment of the disclosure.

FIG. 12 is a diagram illustrating an example of manufacturing a reflective HOE, according to an embodiment of the disclosure. Referring to FIG. 13, a holographic diffractive layer of the reflective HOE may be manufactured by radiating the object beam $L_O$ on a first surface 300a of a transparent photosensitive material 300, such as photo polymer, light refractive glass, or the like, and the reference beam $L_R$ on a second surface 300b opposite to the first surface 300a of the transparent photosensitive material 300 to cross each other with the angle θ therebetween. When a beam of the same wavelength and in the same direction as the reference beam $L_R$ is radiated on the second surface 300b of the transparent photosensitive material 300 manufactured as above, the beam is diffracted at the angle θ and reflected at the second surface 300b. The holographic diffractive layer may be manufactured to meet diffraction characteristics requested from the reflective HOE 140 according to the intensity of the radiated object beam $L_O$ and the radiated reference beam $L_R$.

In the above-described embodiment of the disclosure, a case where each of the first and second display panels 111 and 112 is a monochrome display panel for displaying a monochrome image is described as an example, but embodiments of the disclosure are not limited thereto.

In an embodiment of the disclosure, each of the first and second display panels 111 and 112 may be a full-color display panel for displaying a full-color image. In other words, each of the first and second display panels 111 and 112 includes red subpixels, green subpixels, and blue subpixels on an image panel surface, and one full-color image may be implemented by a combination of a red subpixel, a green subpixel, and a blue subpixel.

In an embodiment of the disclosure, each of the first and second display panels 111 and 112 may include a red display panel, a green display panel, a blue display panel, and an optical coupler for displaying a full-color image by combining a beam of a red image, a beam of a green image, and a beam of a blue image, which are respectively emitted from the red display panel, the green display panel, and the blue display panel.

Figure 14:
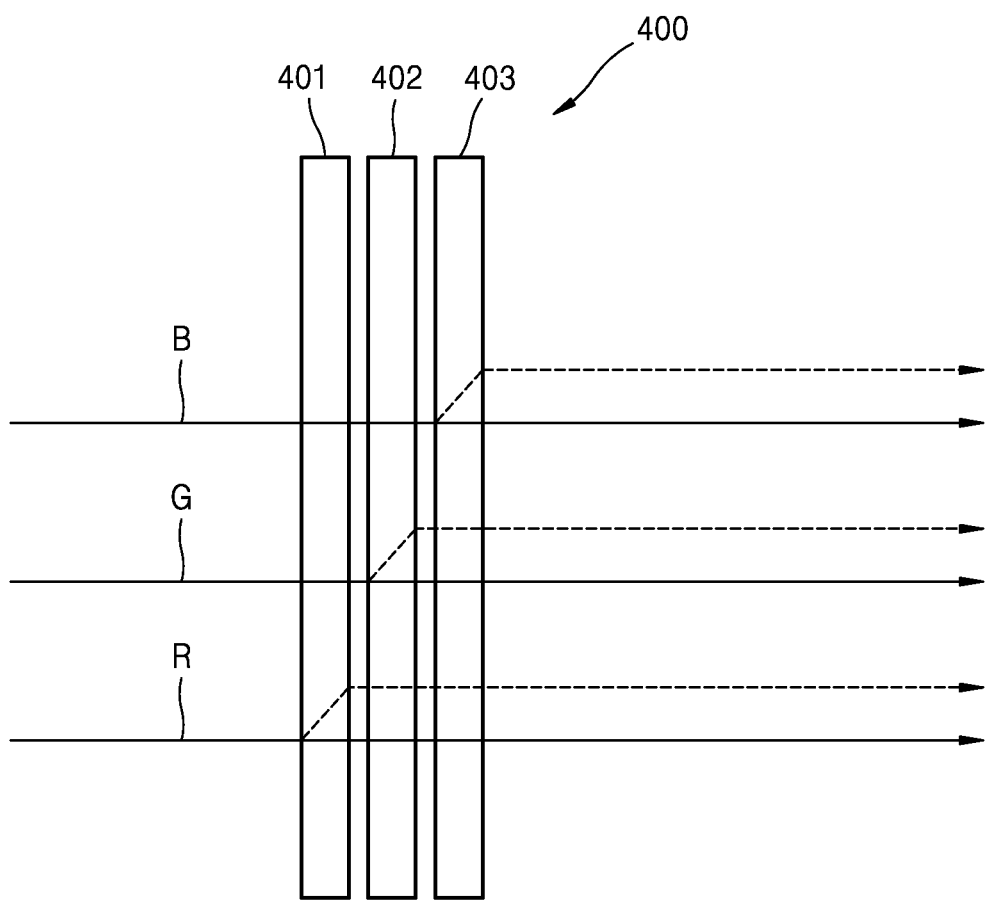
FIG. 14 schematically illustrates the configuration of a transmissive HOE according to an embodiment of the disclosure.
Figure 15:
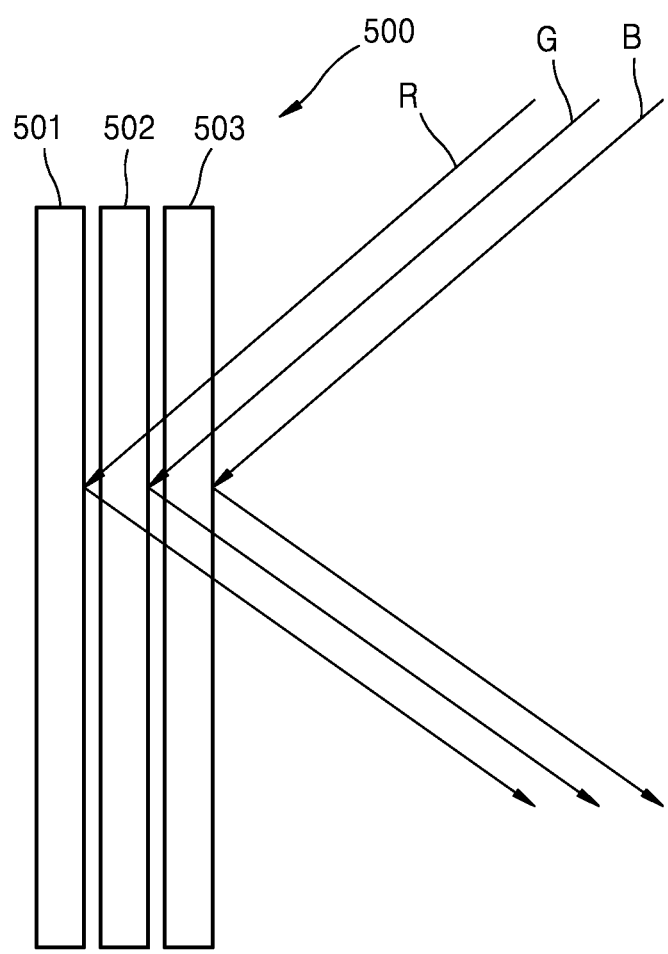
FIG. 15 schematically illustrates the configuration of a reflective HOE according to an embodiment of the disclosure.

Referring to FIGS. 14 and 15, an HOE corresponding to a case where the first and second display panels 111 and 112 emit full-color light will be described.

FIG. 14 schematically illustrates the configuration of a transmissive HOE 400 according to an embodiment of the disclosure. Referring to FIG. 14, the transmissive HOE 400 includes a first transmissive HOE layer 401, a second transmissive HOE layer 402, and a third transmissive HOE layer 403. The first, second, and third transmissive HOE layers 401, 402, and 403 may be in contact with each other and stacked, or may be spaced apart from each other with a transparent spacer therebetween. The first, second, and third transmissive HOE layers 401, 402, and 403 correspond to a red wavelength, a blue wavelength, and a green wavelength, respectively. As described with reference to FIG. 12, the HOE may be manufactured to have diffraction characteristics corresponding to a beam of a certain wavelength, and thus, the first, second, and third transmissive HOE layers 401, 402, and 403 may be manufactured to have diffraction characteristics corresponding to the red wavelength, the blue wavelength, and the green wavelength, respectively. For example, the first transmissive HOE layer 401 may have diffraction characteristics in which only a red beam R is diffracted into and transmitted as first and second diffracted beams, and a green beam G and a blue beam B are transmitted substantially without diffraction. Likewise, the second transmissive HOE layer 402 may have diffraction characteristics in which only the green beam G is diffracted into and transmitted as first and second diffracted beams, and the red beam R and the blue beam B are transmitted substantially without diffraction, and the third transmissive HOE layer 403 may have diffraction characteristics in which only the blue beam B is diffracted into and transmitted as first and second diffracted beams, and the red beam R and the green beam G are transmitted substantially without diffraction. The transmissive HOE 400 may be the first and second transmissive HOEs 131 and 132.

FIG. 15 schematically illustrates the configuration of a reflective HOE 500 according to an embodiment of the disclosure. Referring to FIG. 15, the reflective HOE 500 includes a first reflective HOE layer 501, a second reflective HOE layer 502, and a third reflective HOE layer 503. The first, second, and third reflective HOE layers 501, 502, and 503 may be in contact with each other and stacked, or may be spaced apart from each other with a transparent spacer therebetween. The first, second, and third reflective HOE layers 501, 502, and 503 correspond to a red wavelength, a blue wavelength, and a green wavelength, respectively. As described with reference to FIG. 12, the HOE may be manufactured to have diffraction characteristics corresponding to a beam of a certain wavelength, and thus, the first, second, and third reflective HOE layers 501, 502, and 503 may be manufactured to have diffraction characteristics corresponding to the red wavelength, the blue wavelength, and the green wavelength, respectively. For example, the first reflective HOE layer 501 may have diffraction characteristics in which only the red beam R is diffracted into and reflected as first and second diffracted beams, and the green beam G and the blue beam B are reflected substantially without diffraction. Likewise, the second reflective HOE layer 502 may have diffraction characteristics in which only the green beam G is diffracted into and reflected as first and second diffracted beams, and the red beam R and the blue beam B are reflected substantially without diffraction, and the third reflective HOE layer 503 may have diffraction characteristics in which only the blue beam B is diffracted into and reflected as first and second diffracted beams, and the red beam R and the green beam G are transmitted substantially without diffraction. The reflective HOE 500 may be the reflective HOE 140.

The transmissive HOE or reflective HOE corresponding to full-color is not limited to the HOE having a multilayer structure described with reference to FIGS. 14 and 15, and an HOE having a single layer structure may also have diffraction characteristics corresponding to full-color.

Next, referring to FIGS. 16 to 18, a method of forming an image of a projector, according to an embodiment of the disclosure, will be described.

Figure 16:
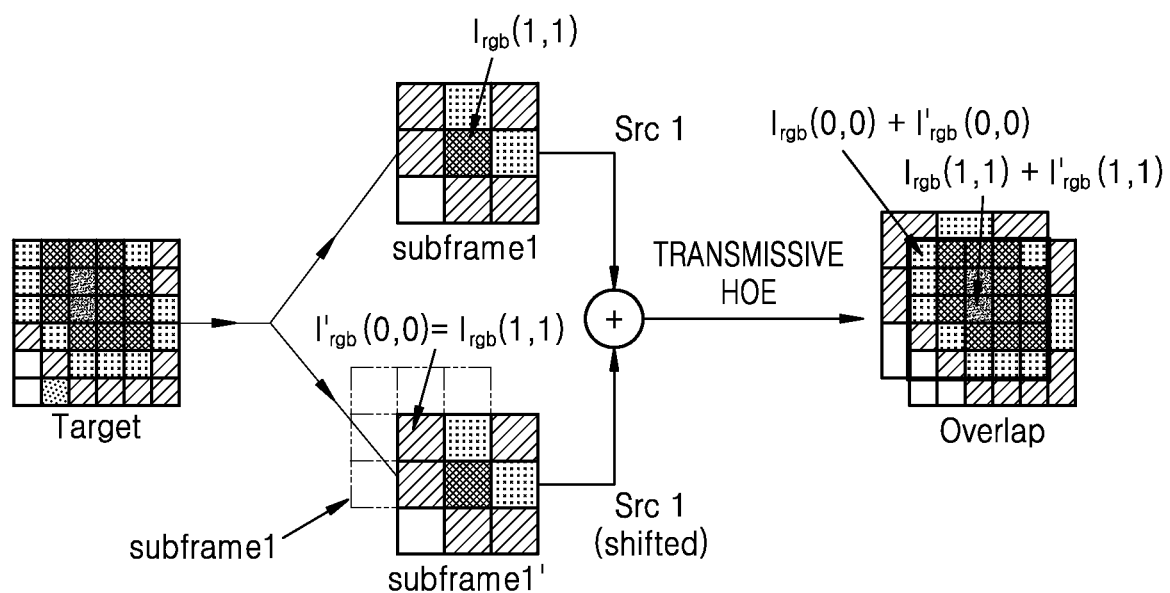
FIG. 16 is a diagram illustrating a method of forming an image by using a transmissive HOE of a projector, according to an embodiment of the disclosure.

FIG. 16 is a diagram illustrating a method of forming an image by using a transmissive HOE of a projector, according to an embodiment of the disclosure.

Referring to FIG. 16, N low-resolution subframe images having the same pixel color information are created. For example, when one transmissive HOE is used, N may be 2. One piece of subframe information may be determined through a known method such that, in an area where pixels overlap each other, a color information (light intensity of RGB) value of a pixel is as similar to pixel information of a target image as possible. Image information of a subframe is input to one display panel Src 1, and pixels of a subframe 1 are shifted by a size smaller than a diagonal length of a pixel in a diagonal direction of the pixel and combined with pixels of a shifted subframe 1' by using the transmissive HOE, thereby creating an image of a high-resolution frame.

Figure 17:
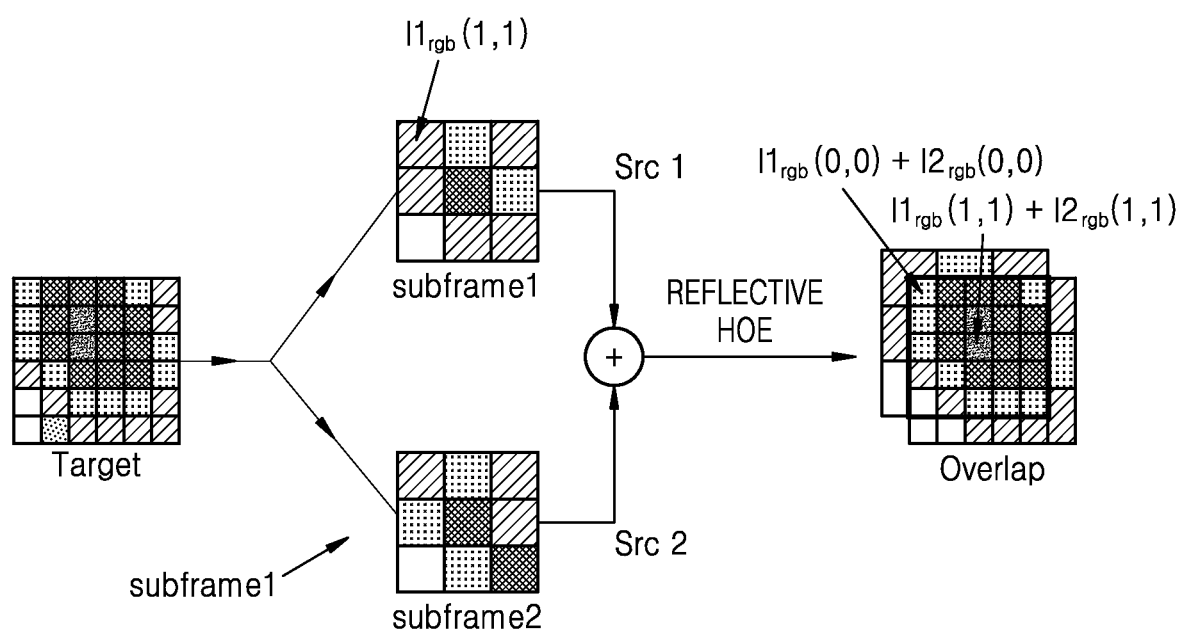
FIG. 17 is a diagram illustrating a method of forming an image by using a reflective HOE of a projector, according to an embodiment of the disclosure.

FIG. 17 is a diagram illustrating a method of forming an image by using a reflective HOE of a projector, according to an embodiment of the disclosure.

Referring to FIG. 17, N low-resolution subframe images 1 and 2 having different pixel color information are created. For example, when one reflective HOE is used, N may be 2. When pixels are combined together by a shift, pieces of information of the subframes 1 and 2 are determined such that a color information (light intensity of RGB) value of a pixel is as similar to pixel information of a target image as possible in an overlapping area. A known algorithm such as a wobulation technology may be used for a method of obtaining pieces of information of the subframes 1 and 2. Image information of the subframes 1 and 2 is input to two display units, and pixels of the subframes 1 and 2 are shifted to each other by a size smaller than a diagonal length of a pixel in a diagonal direction of the pixel and the subframes 1 and 2 are combined by using the reflective HOE, thereby creating an image of a high-resolution frame.

Figure 18:
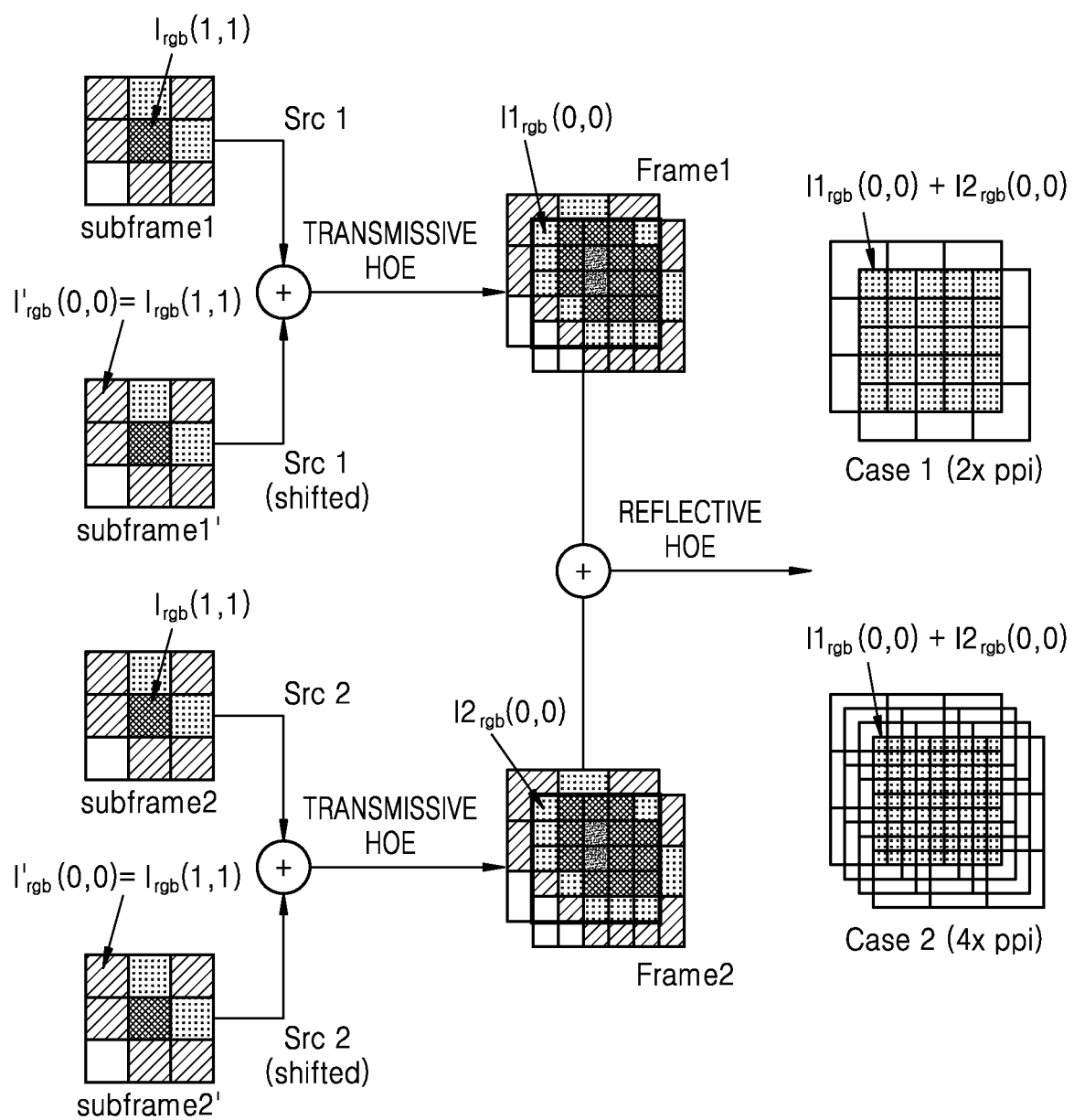
FIG. 18 is a diagram illustrating a method of forming an image by using a combination of a transmissive HOE and a reflective HOE of a projector, according to an embodiment of the disclosure.

FIG. 18 is a diagram illustrating a method of forming an image by using a combination of a transmissive HOE and a reflective HOE of a projector, according to an embodiment of the disclosure.

Information of a subframe 1 is input to a first display, and pixels of the subframe 1 are shifted and combined with pixels of the shifted subframe 1' through a first transmissive HOE, thereby creating an image of a high-resolution frame 1.

Information of a subframe 2 is input to a second display, and pixels of the subframe 2 are shifted and combined with a shifted subframe 2' through a second transmissive HOE, thereby creating an image of a high-resolution frame 2.

The frame 1 and the frame 2 are combined through the reflective HOE. At this time, an image may be created in two cases.

Case 1 has twice the pixel density (2× ppi), and is where the frame 1 and the frame 2 are different images, and a value of each p/2 pixel thus created when the frame 1 and the frame 2 are combined together is set to be equal to a value of each pixel of a target image.

Case 2 is where four times the pixel density (4× ppi) is targeted, the frame 1 and the frame 2 are different images or identical images, and a value of p/4 thus created when the frame 1 and the frame 2 are combined together is set to be equal to a value of each pixel of a target image as much as possible.

Information of an image, such as a blur phenomenon occurring when pixels overlap each other in the frame 1, may be combined with information enabling an edge portion to be highlighted in the frame 2 to make the image to be clearer.

Figure 19:
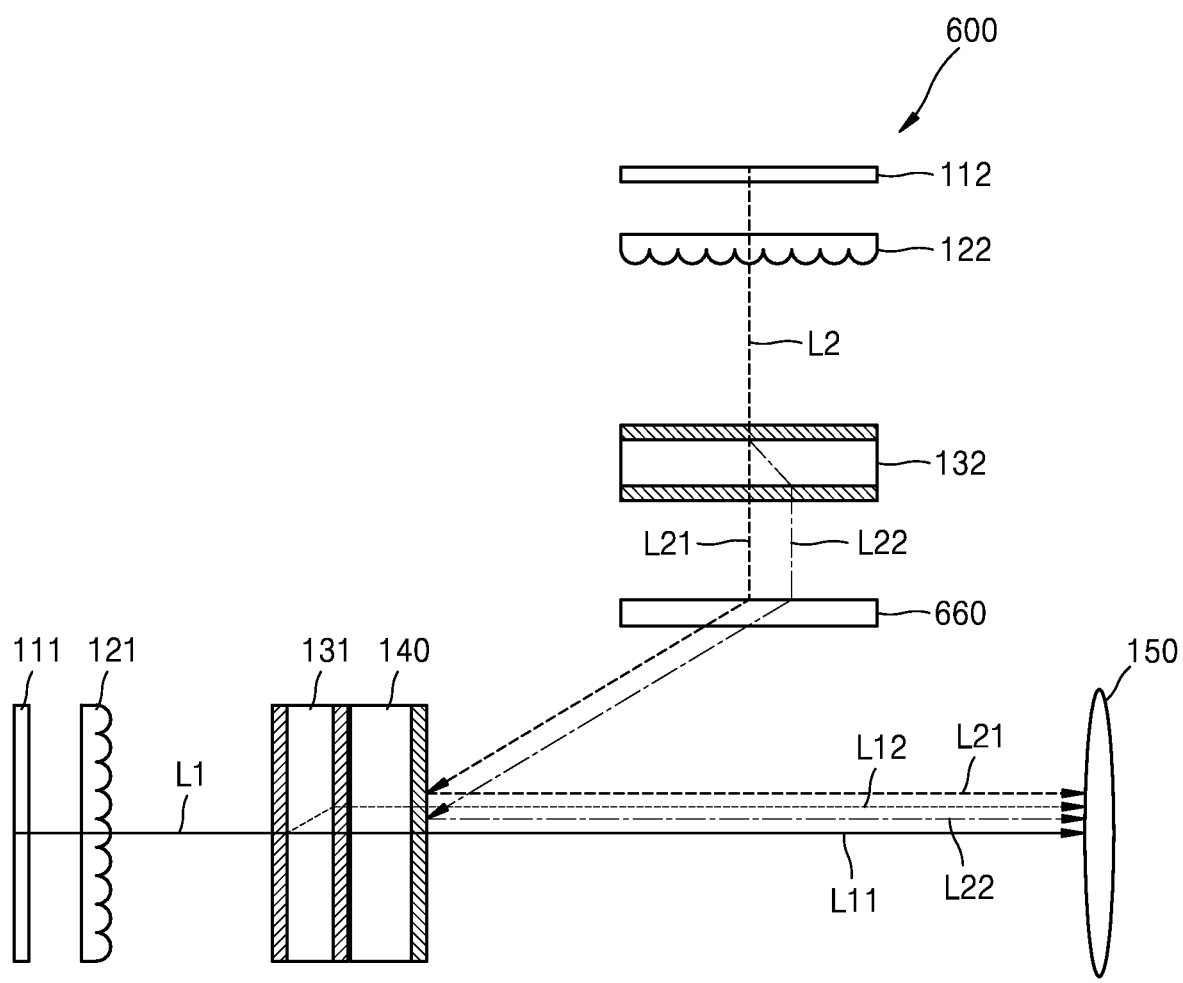
FIG. 19 schematically illustrates an optical system of a projector according to an embodiment of the disclosure.
Figure 20:
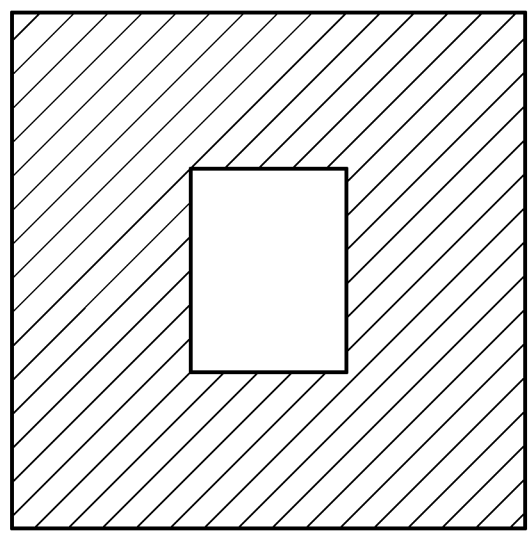
FIG. 20 is a diagram illustrating image distortion that occurs when there is no correction HOE.
Figure 21:
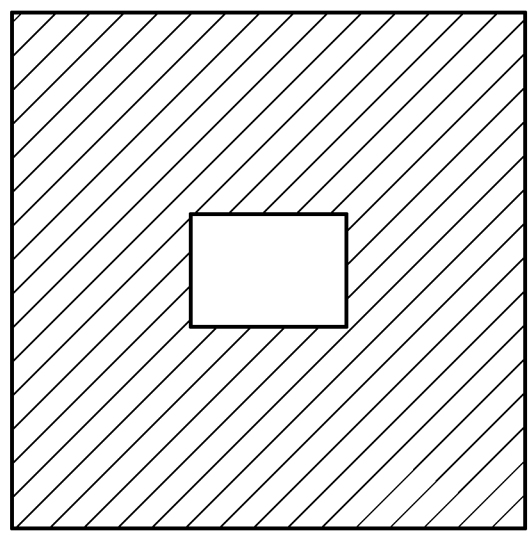
FIG. 21 is a diagram illustrating image pre-distortion intentionally generated by a correction HOE.
Figure 22:
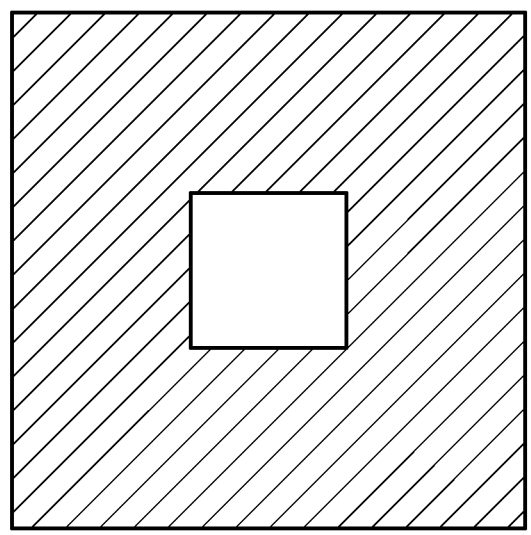
FIG. 22 is a diagram illustrating an image corrected by a correction HOE.

FIG. 19 schematically illustrates an optical system of a projector according to an embodiment of the disclosure, FIG. 20 is a diagram illustrating image distortion that occurs when there is no correction HOE, FIG. 21 is a diagram illustrating image pre-distortion intentionally generated by a correction HOE, and FIG. 22 is a diagram illustrating an image corrected by a correction HOE.

Referring to FIGS. 19 to 22, a projector 600 includes the first and second display panels 111 and 112, the first and second transmissive HOEs 131 and 132, the reflective HOE 140, a correction element 660, and the projection lens 150. The projector 600 of the present embodiment of the disclosure is substantially the same as the projector of the above-described embodiment of the disclosure, except that the projector 600 further includes the correction element 660, and thus, details related to the correction element 660 will be mainly described.

The correction element 660 is arranged on a path of the third and fourth diffracted beams L21 and L22 between the second transmissive HOE 132 and the reflective HOE 140.

As illustrated in FIG. 19, because the second transmissive HOE 132 should be arranged not to interfere with paths of the first, second, third, and fourth diffracted beams L11, L12, L21, and L22 overlapping each other in the reflective HOE 140 and traveling toward the projection lens 150, the third and fourth diffracted beams L21 and L22 emitted from the second transmissive HOE 132 are obliquely incident on the reflective HOE 140. The reflective HOE 140 diffracts and reflects the emitted third and fourth diffracted beams L21 and L22 to travel in the same direction as the first and second diffracted beams L11 and L12, and thus, incident angles and reflection angles of the third and fourth diffracted beams L21 and L22 are different. As such, as illustrated in FIG. 20, image distortion occurs in images included in the third and fourth diffracted beams L21 and L22 that are obliquely incident on from the reflective HOE 140 and are diffracted and reflected by the reflective HOE 140. Accordingly, as illustrated in FIG. 21, the correction element 660 corrects distortion caused by the diffraction and reflection of the reflective HOE 140 by pre-distorting the third and fourth diffracted beams L21 and L22, such that a normal image may be displayed as illustrated in FIG. 22. The correction element 660 may be an HOE generating image pre-distortion by diffracting the third and fourth diffracted beams L21 and L22 to correspond to the angular relationship generated by the reflective HOE 140, but the disclosure is not limited thereto.

Figure 23:
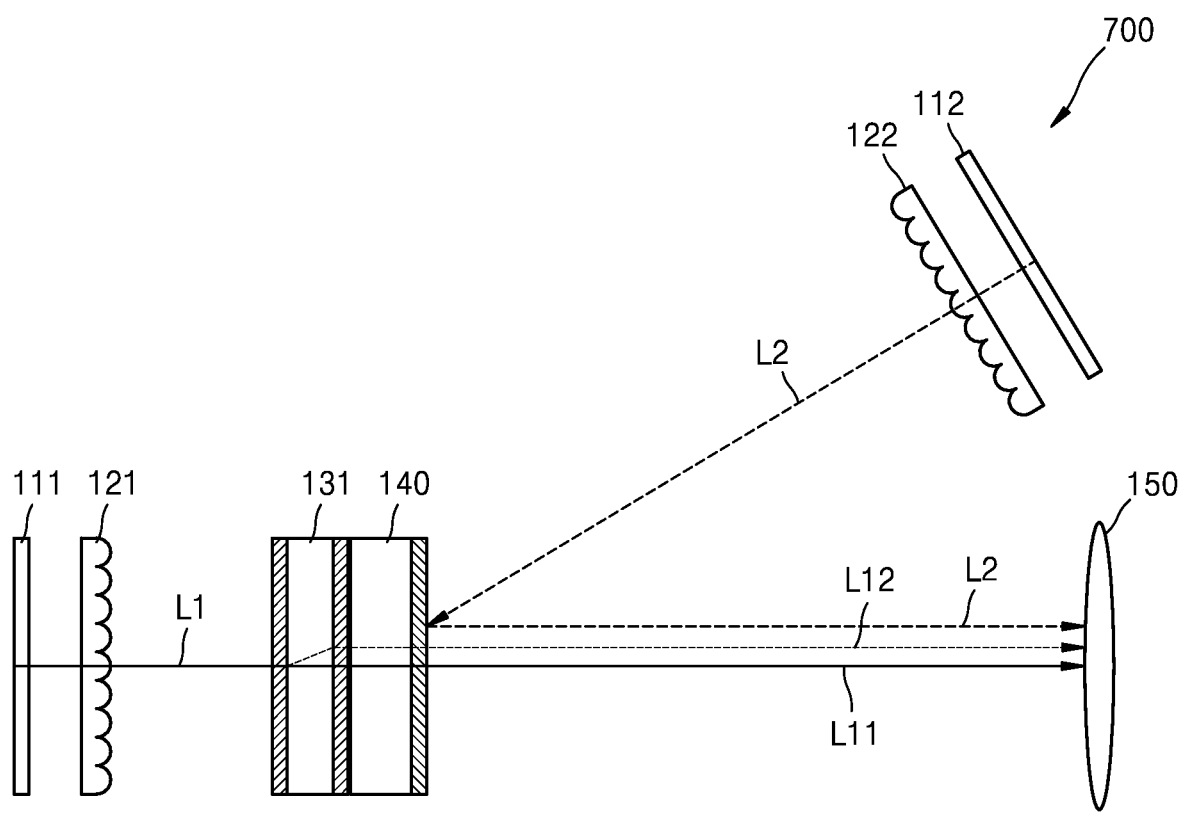
FIG. 23 schematically illustrates an optical system of a projector according to an embodiment of the disclosure.
Figure 24:
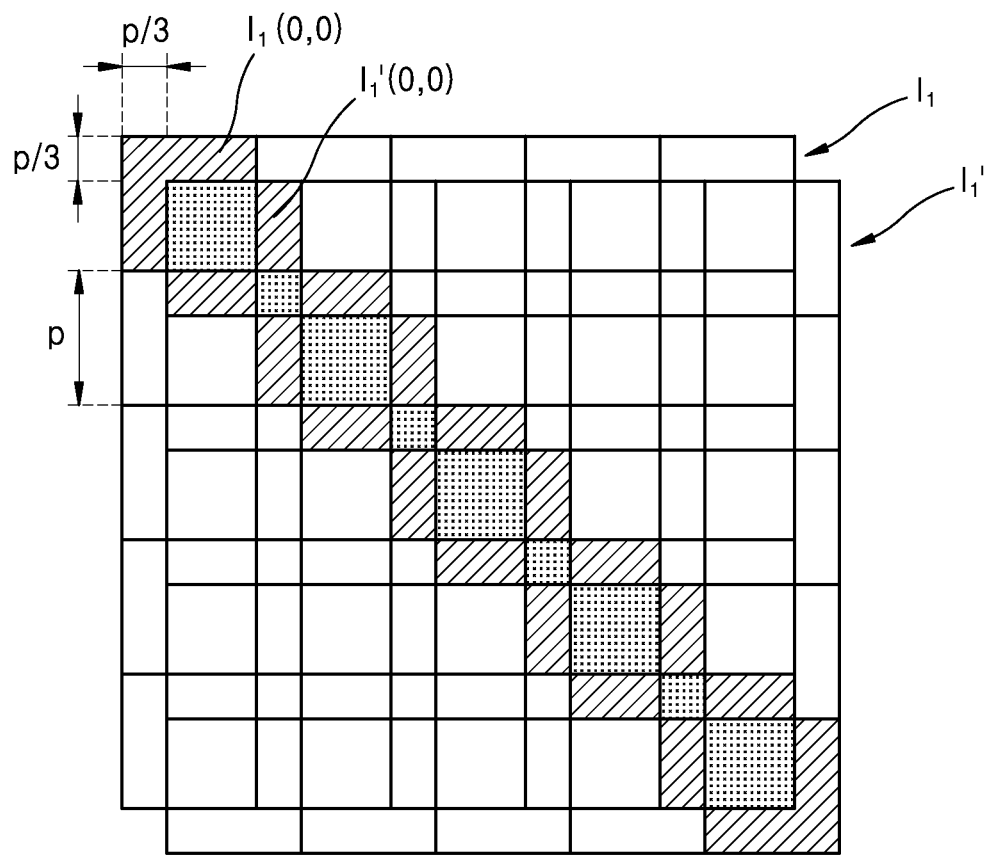
FIG. 24 schematically illustrates that pixels of a first image are partially overlapped by a transmissive HOE, according to an embodiment of the disclosure.
Figure 25:
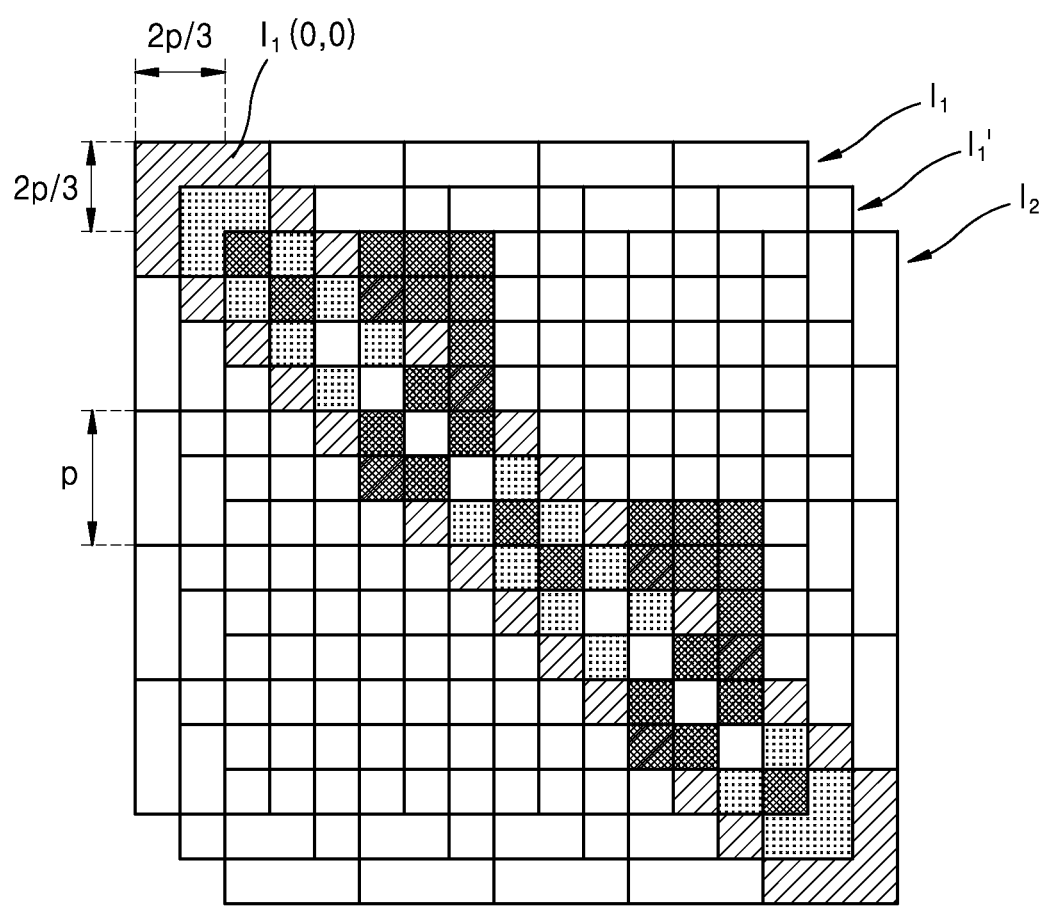
FIG. 25 schematically illustrates that a first image and a second image are partially overlapped with each other by a reflective HOE, according to an embodiment of the disclosure.

FIG. 23 schematically illustrates an optical system of a projector 700 according to an embodiment of the disclosure, FIG. 24 schematically illustrates that pixels of a first image are partially overlapped by a transmissive HOE, according to an embodiment of the disclosure, and FIG. 25 schematically illustrates that a first image and a second image are partially overlapped with each other by a reflective HOE, according to an embodiment of the disclosure.

Referring to FIG. 23, the projector 700 includes the first and second display panels 111 and 112, the first transmissive HOE 131, the reflective HOE 140, and the projection lens 150. The projector 700 of the present embodiment of the disclosure is substantially the same as the projectors 100 and 600, except that the projector 700 does not include the second transmissive HOE 132, and thus, differences will be mainly described.

The first beam L1 emitted from the first display panel 111 is separated into the first diffracted beam L11 and the second diffracted beam L12 by the first transmissive HOE 131.

The first diffraction image $I_1$ by the first diffracted beam L11 and the second diffraction image $I_1'$ by the second diffracted beam L12 are shifted by p/3 in a row direction and by p/3 in a column direction to form a sub overlapping image, as shown in FIG. 24. In other words, the first and second diffraction images $I_1$ and $I_1'$ may be shifted by ⅓ of a diagonal length in a diagonal direction to overlap each other, and pixels corresponding to each other may overlap each other by 4/9 area.

A second image $I_2$ of the second beam L2 diffracted and reflected by the reflective HOE 140 is shifted by p2/3 in a row direction and by p/23 in a column direction with respect to the first diffraction image $I_1$, as shown in FIG. 25. As a result, the first and second diffraction images $I_1$ and $I_1'$ formed by the first transmissive HOE 131 and the second image $I_2$ are combined in the reflective HOE 140 to form an overlapping image. A pixel density of the overlapping image may be trebled, and thus an image is displayed with greater detail and becomes clearer, and the brightness may be increased by a factor of up to three.

Figure 26:
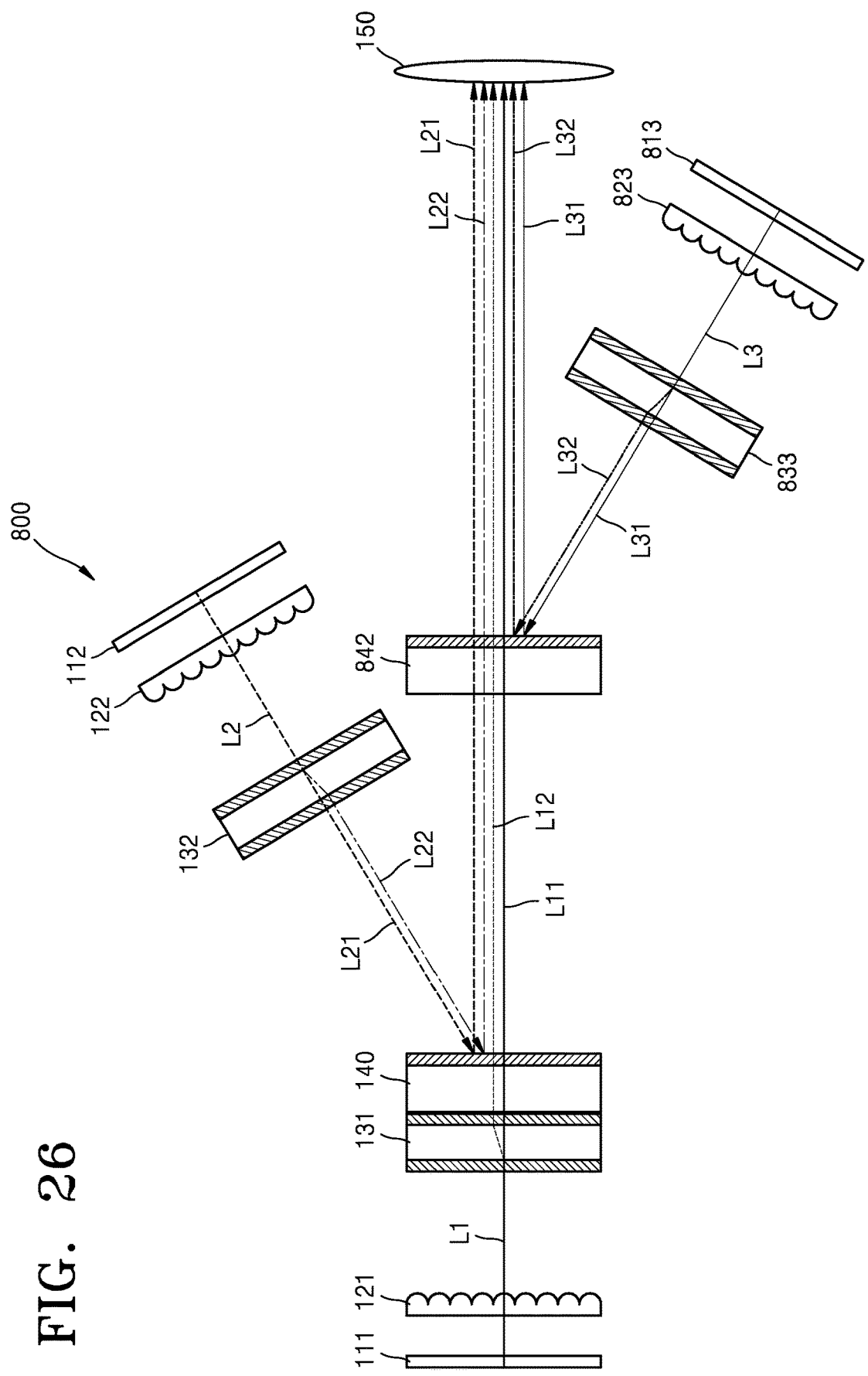
FIG. 26 schematically illustrates an optical system of a projector according to an embodiment of the disclosure.

FIG. 26 schematically illustrates an optical system of a projector 800 according to an embodiment of the disclosure. Referring to FIG. 26, the projector 800 includes first, second, and third display panels 111, 112, and 813, first, second, and third transmissive HOEs 131, 132, and 833, the reflective HOE 140, a second reflective HOE 842, and the projection lens 150. The projector 800 of the present embodiment of the disclosure is substantially the same as the projectors 100, 600, and 700, except that the projector 800 further includes the third display panel 813, the third transmissive HOE 833, and the second reflective HOE 842, and thus differences will be mainly described.

The third display panel 813 emits a third beam L3 corresponding to a third image. The third image may include rows and columns of third pixels. The third image may be the same as the first and second images respectively displayed on the first and second display panels 111 and 112, but may have pixel color information different from the first and second images. The first to third images may be determined such that pixel color information of an overlapping image formed by the optical system of the present embodiment of the disclosure is similar to pixel color information of a target image as much as possible.

In an embodiment of the disclosure, a third collimating lens 823 for collimating, into a parallel beam, the third beam L3 emitted from the third display panel 813 may be provided on a front surface of the third display panel 813.

The third transmissive HOE 833 is arranged on the front surface of the third display panel 813. The third collimating lens 823 may be arranged between the third display panel 813 and the third transmissive HOE 833. The third transmissive HOE 833 may be arranged such that the third beam L3 is vertically incident on an incident surface of the third transmissive HOE 833, but the disclosure is not limited thereto.

The third transmissive HOE 833 separates the third beam L3 into a fifth diffracted beam L31 and a sixth diffracted beam L32 and transmits the fifth and sixth diffracted beams L31 and L32 such that pixels corresponding to the fifth diffracted beam L31 and pixels corresponding to the sixth diffracted beam L32 are shifted by a third distance shorter than a length of one pixel in a certain direction to overlap each other. The third distance by which the fifth and sixth diffracted beams L31 and L32 are shifted may be equal to the first distance by which the first and second diffracted beams L11 and L12 are shifted and/or may be equal to the second distance by which the third and fourth diffracted beams L21 and L22 are shifted, but the disclosure is not limited thereto.

In an embodiment of the disclosure, pixels corresponding to the fifth diffracted beam L31 and pixels corresponding to the sixth diffracted beam L32 may be shifted by a distance shorter than a diagonal length of one pixel in a diagonal direction to overlap each other.

The third transmissive HOE 833 may include a fifth holographic diffractive layer through which the third beam L3 is diffracted into the fifth diffracted beam L31 and the sixth diffracted beam L32, and a sixth holographic diffractive layer through which the fifth diffracted beam L31 and the sixth diffracted beam L32 are diffracted and transmitted in the same direction with the third distance therebetween. The third transmissive HOE 833 may have substantially the same structure as the first transmissive HOE 131 described with reference to FIG. 2, and thus redundant descriptions are omitted.

The second reflective HOE 842 reflects the fifth and sixth diffracted beams L31 and L32 and transmits the first to fourth diffracted beams L11, L12, L21, and L22 of the first and second images, thereby combining the first, second, third, and fourth diffracted beams L11, L12, L21, and L22 of the first and second images and the fifth and sixth diffracted beams L31 and L32 of the third image together such that pixels of the first image, pixels of the second image, and pixels of the third image at least partially overlap each other. In the second reflective HOE 842, a distance between the reflected fifth and sixth diffracted beams L31 and L32 and transmitted first and second diffracted beams L11 and L12 may be greater than or equal to 0 and may be smaller than a length of one pixel in a certain direction.

The second reflective HOE 842 may be arranged to obliquely face the third transmissive HOE 833. A separate optical element (for example, a correction member or a reflective member) may be arranged between the second reflective HOE 842 and the third transmissive HOE 833.

The second reflective HOE 842 may be arranged apart from the reflective HOE 140, and the second reflective HOE 842 may be arranged outside a path of the third and fourth diffracted beams L21 and L22, between the second transmissive HOE 132 and the reflective HOE 140.

Each of the first, second, and third display panels 111, 112, and 813 may be a monochrome display panel or a full-color display panel. When each of the first, second, and third display panels 111, 112, and 813 is a full-color display panel, the third transmissive HOE 833 and the second reflective HOE 842 may each have a multilayer structure of HOE layers having diffraction characteristics and respectively corresponding to a red wavelength, a blue wavelength, and a green wavelength, or may each be an HOE of a multilayer structure having diffraction characteristics corresponding to full-color.

A beam of an overlapping image formed by a combination of the first, second, third, fourth, fifth, and sixth diffracted beams L11, L12, L21, L22, L31, and L32 in the second reflective HOE 842 may be projected by the projection lens 150.

Figure 27:
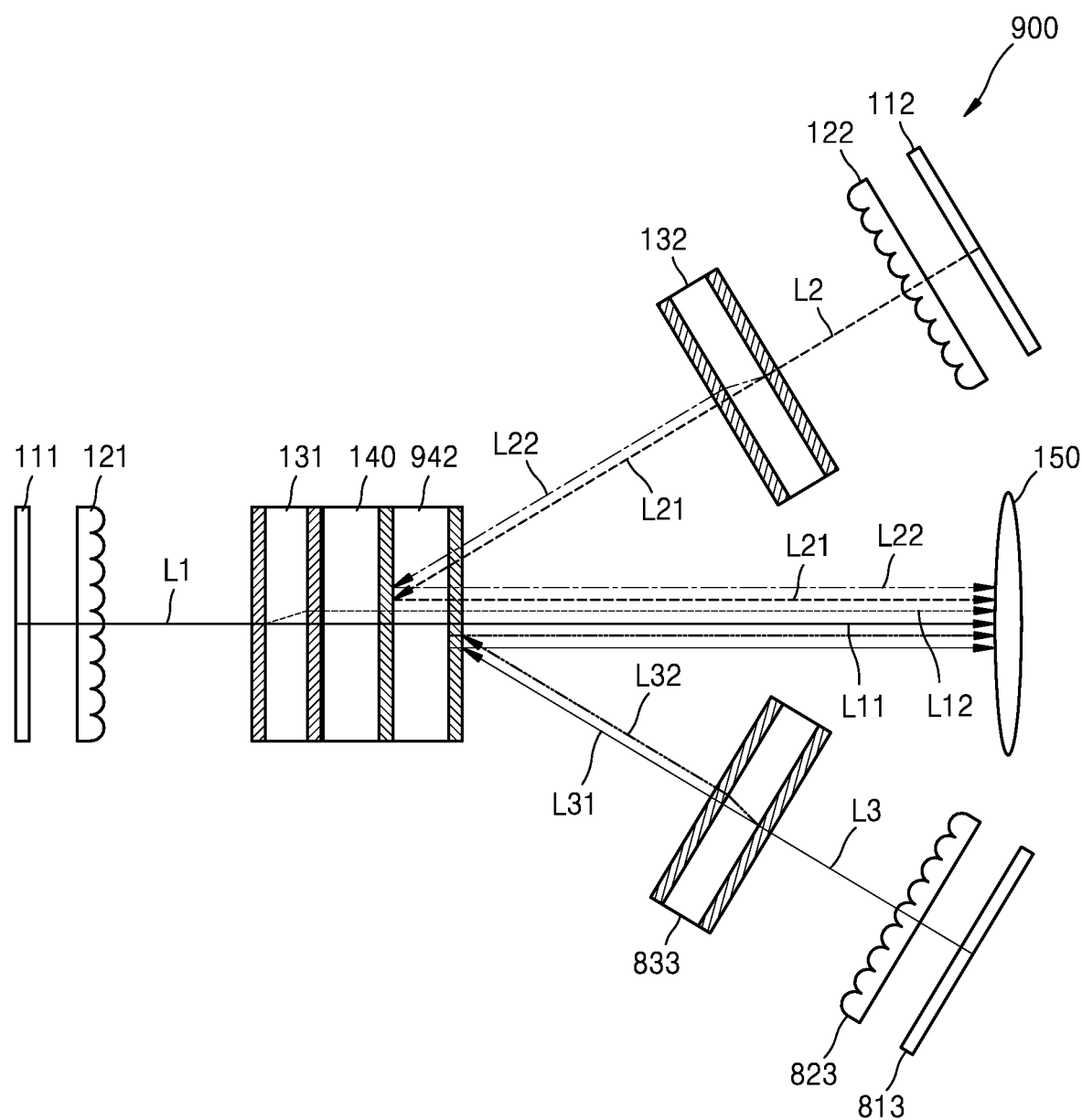
FIG. 27 schematically illustrates an optical system of a projector according to an embodiment of the disclosure.

FIG. 27 schematically illustrates an optical system of a projector 900 according to an embodiment of the disclosure. Referring to FIG. 27, the projector 900 includes the first, second, and third display panels 111, 112, and 813, the first, second, and third transmissive HOEs 131, 132, and 833, the reflective HOE 140, a second reflective HOE 942, and the projection lens 150. The projector 900 of the present embodiment of the disclosure is substantially the same as the projector 800 described with reference to FIG. 26, except that the second reflective HOE 942 is arranged adjacent to the reflective HOE 140, and each of the first to third display panels 111, 112, and 813 is limited to a monochrome display panel, and thus differences will be mainly described.

Referring to FIG. 27, the first, second, and third display panels 111, 112, and 813 may be monochrome display panels of different colors. For example, the first, second, and third display panels 111, 112, and 813 may be a red display panel, a green display panel, and a blue display panel, respectively. The first, second, and third images formed on the first, second, and third display panels 111, 112, and 813 may be, for example, red, green, and blue images displaying the same image, respectively, and a full-color image may be implemented by a combination of the first to third images.

The second reflective HOE 942 may be arranged adjacent to the reflective HOE 140. In an embodiment of the disclosure, the second reflective HOE 942 may be arranged to be in contact with the reflective HOE 140. In an embodiment of the disclosure, the second reflective HOE 942 and the reflective HOE 140 may be bonded together to form an integral optical element.

The second reflective HOE 942 may be designed to correspond to a wavelength band of the third beam L3 emitted from the third display panel 813, thereby reflecting only the fifth and sixth diffracted beams L31 and L32 among the third, fourth, fifth, and sixth diffracted beams L21, L22, L31, and L32 incident on the same incident surface, and transmitting the third and fourth diffracted beams L21 and L22 without reflection. Also, the first, second, third, and fourth diffracted beams L11, L12, L21, and L22 incident on a surface (a rear surface) opposite to the incident surface of the second reflective HOE 942 may be transmitted substantially without diffraction.

The reflective HOE 140 may allow pixels of the first and second diffracted beams L11 and L12 and pixels of the third and fourth diffracted beams L3 and L4 to overlap each other, and the second reflective HOE 942 may allow pixels of the first and second diffracted beams L11 and L12, pixels of the third and fourth diffracted beams L3 and L4, and pixels of the fifth and sixth diffracted beams L31 and L32 to overlap each other, which may be understood as a case where the distance A is 0 in the embodiment of the disclosure described with reference to FIG. 3.

As a result, an overlapping image formed by a combination of the first, second, third, fourth, fifth, and sixth diffracted beams L11, L12, L21, L22, L31, and L32 in the second reflective HOE 942 may be a full-color image by an overlap of the red image, the green image, and the blue image.

Figure 28:
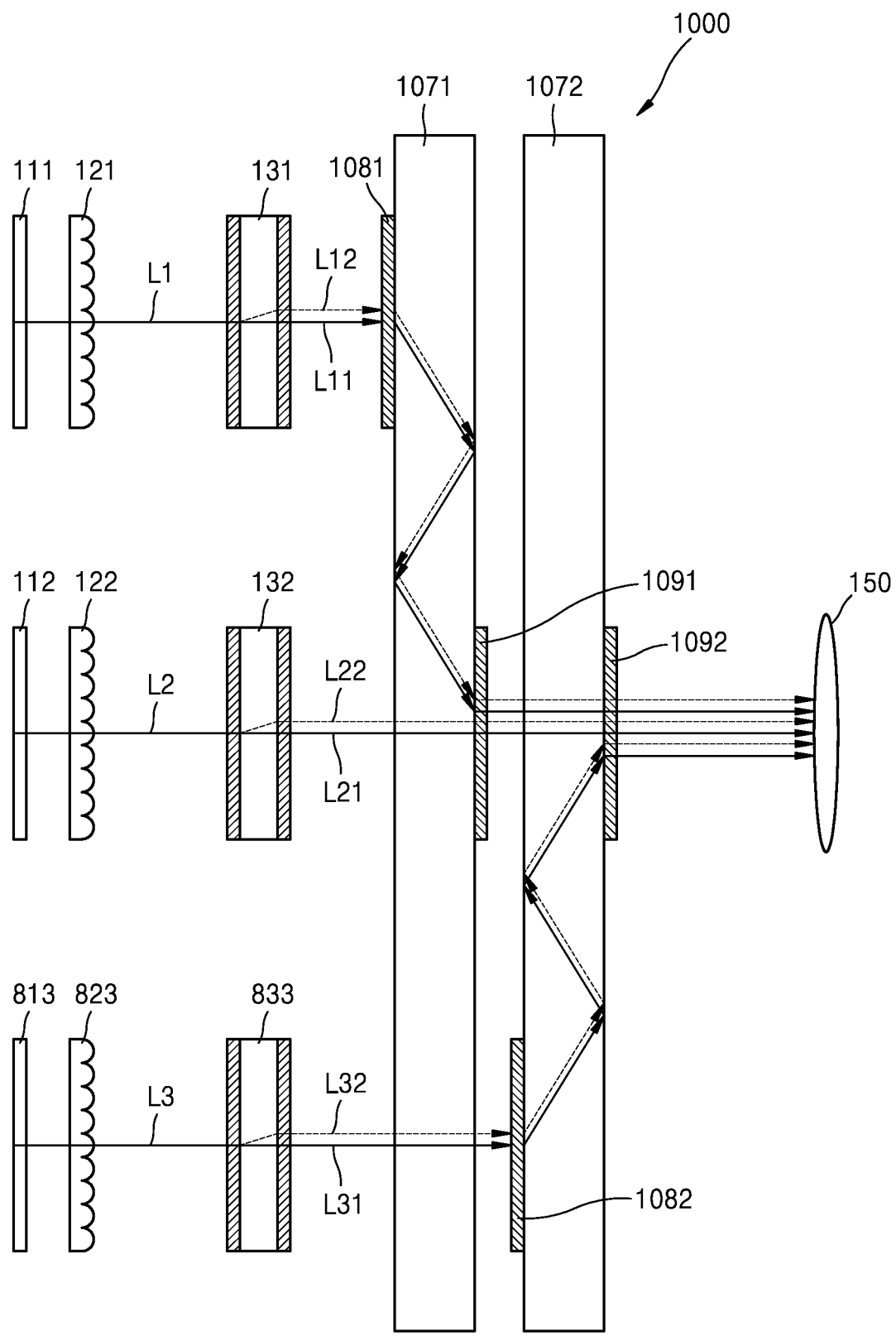
FIG. 28 schematically illustrates an optical system of a projector according to an embodiment of the disclosure.

FIG. 28 schematically illustrates an optical system of a projector 1000 according to an embodiment of the disclosure.

Referring to FIG. 28, the projector 1000 includes the first, second, and third display panels 111, 112, and 813, the first, second, and third transmissive HOEs 131, 132, and 833, first and second waveguides 1071 and 1072, and first and second input couplers 1081 and 1082, and first and second output couplers 1091 and 1092, and the projection lens 150. The first, second, and third display panels 111, 112, and 813 and the first, second, and third transmissive HOEs 131, 132, and 833 of the projector 1000 of the present embodiment of the disclosure are substantially the same as those of the projector 800, and thus differences will be mainly described.

The first and second waveguides 1071 and 1072 may include a material that is transparent with respect to the first, second, and third beams L1, L2, and L3, and may have a flat plate shape. The first and second waveguides 1071 and 1072 may be apart from each other. The first and second waveguides 1071 and 1072 may include a spacer therebetween.

The first, second, and third display panels 111, 112, and 813 may be arranged in parallel on one surface of the first waveguide 1071.

The first, second, and third transmissive HOEs 131, 132, and 833 may be arranged between the first, second, and third display panels 111, 112, and 813 and the first waveguide 1071, respectively.

The first input coupler 1081 combines the first and second diffracted beams L11 and L12 separated by the first transmissive HOE 131 into the first waveguide 1071. The first input coupler 1081 may be, for example, a diffractive optical element (DOE) or an HOE. The first input coupler 1081 may be provided on a surface of the first waveguide 1071 facing the first transmissive HOE 131, or a surface opposite to the surface.

The second input coupler 1082 combines the fifth and sixth diffracted beams L31 and L32 separated by the third transmissive HOE 833 into the second waveguide 1072. The second input coupler 1082 may be, for example, a DOE or an HOE. The second input coupler 1082 may be provided on a surface of the second waveguide 1072 facing the third transmissive HOE 833, or a surface opposite to the surface.

The first output coupler 1091 outputs, to the outside, the first and second diffracted beams L11 and L12 propagating in the first waveguide 1071. The first output coupler 1091 may be, for example, a DOE or an HOE. The first output coupler 1091 may be provided on a surface opposite to a surface of the first waveguide 1071 facing the second transmissive HOE 132.

The second output coupler 1092 outputs, to the outside, the fifth and sixth diffracted beams L31 and L32 propagating in the second waveguide 1072. The second output coupler 1092 may be, for example, a DOE or an HOE. The second output coupler 1092 may be provided on a surface opposite to a surface of the second waveguide 1072 facing the second transmissive HOE 132.

The first display panel 111 emits the first beam L1 including the first image, and the first transmissive HOE 131 diffracts and separate the first beam L1 into the first and second diffracted beams L11 and L12 such that pixels corresponding to the first diffracted beam L11 and pixels corresponding to the second diffracted beam L12 are shifted by the first distance shorter than a length of one pixel in a certain direction to overlap each other. The first and second diffracted beams L11 and L12 are combined in the first waveguide 1071 through the first input coupler 1081, and are totally reflected and propagate in the first waveguide 1071.

The first and second diffracted beams L11 and L12 that are totally reflected and propagate in the first waveguide 1071 are output from the first waveguide 1071 through the first output coupler 1091. The first and second diffracted beams L11 and L12 output from the first waveguide 1071 pass through the second waveguide 1072.

The second display panel 112 emits the second beam L2 including the second image, and the second transmissive HOE 132 diffracts and separates the second beam L2 into the third and fourth diffracted beams L21 and L22 such that pixels corresponding to the third diffracted beam L21 and pixels corresponding to the fourth diffracted beam L22 are shifted by the second distance shorter than a length of one pixel in a certain direction to overlap each other. The third and fourth diffracted beams L21 and L22 pass through the first and second waveguides 1071 and 1072. As the first output coupler 1091 is provided on the surface opposite to the surface of the first waveguide 1071 facing the second transmissive HOE 132, pixels corresponding to the first and second diffracted beams L11 and L12 and pixels corresponding to the third and fourth diffracted beams L21 and L22 may at least partially overlap each other.

The third display panel 813 emits the third beam L3 including the third image, and the third transmissive HOE 833 diffracts and separates the third beam L3 into the fifth and sixth diffracted beams L31 and L32 such that pixels corresponding to the fifth diffracted beam L31 and pixels corresponding to the sixth diffracted beam L32 are shifted by the second distance shorter than a length of one pixel in a certain direction to overlap each other. The fifth and sixth diffracted beams L31 and L32 pass through the first waveguide 1071 and are combined in the second waveguide 1072 through the second input coupler 1082, and are totally reflected and propagate in the second waveguide 1072. The fifth and sixth diffracted beams L31 and L32 that are totally reflected and propagate in the second waveguide 1072 are output from the second waveguide 1072 through the second output coupler 1092.

As the second output coupler 1092 is provided on the surface opposite to the surface of the second waveguide 1072 facing the second transmissive HOE 132, pixels corresponding to the first to fourth diffracted beams L11, L12, L21, and L22 and pixels corresponding to the fifth and sixth diffracted beams L31 and L32 may at least partially overlap each other.

The first to sixth diffracted beams L11, L12, L21, L22, L31, and L32 may be projected by the projection lens 150 while pixels corresponding to each other are at least partially overlap each other.

Figure 29:
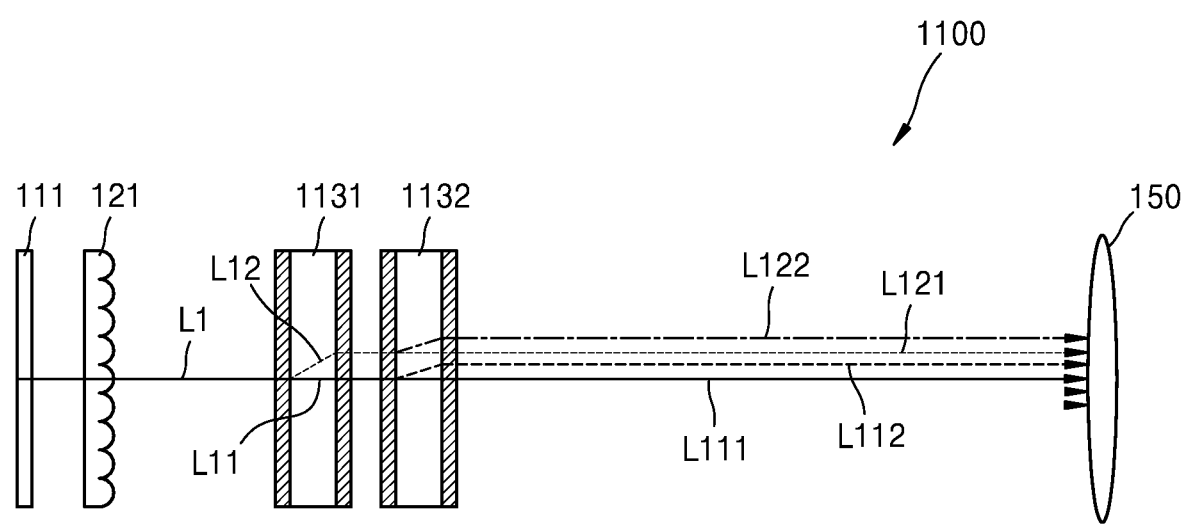
FIG. 29 schematically illustrates an optical system of a projector according to an embodiment of the disclosure.

FIG. 29 schematically illustrates an optical system of a projector 1100 according to an embodiment of the disclosure. Referring to FIG. 29, the projector 1100 includes the first display panel 111, first and second transmissive HOEs 1131 and 1132, and the projection lens 150.

The first display panel 111 is substantially the same as the projector 100 described with reference to FIG. 1. Each of the first and second transmissive HOEs 1131 and 1132 is substantially the same as the first transmissive HOE 131 described with reference to FIG. 2.

The first display panel 111 emits the first beam L1 including the first image. The first transmissive HOE 1131 diffracts and separates the first beam L1 into the first and second diffracted beams L11 and L12 such that pixels corresponding to the first diffracted beam L11 and pixels corresponding to the second diffracted beam L12 are shifted by the first distance shorter than a length of one pixel in a certain direction to overlap each other. The second transmissive HOE 1132 re-diffracts and separates the first diffracted beam L11 into first-first and first-second diffracted beams L111 and L112, such that pixels corresponding to the first-first diffracted beam L111 and pixels corresponding to the first-second diffracted beam L112 are shifted by the second distance shorter than a length of one pixel in a certain direction to overlap each other. Likewise, the second transmissive HOE re-diffracts and separates the second diffracted beam L12 into second-first and second-second diffracted beams L121 and L122 such that pixels corresponding to the second-first diffracted beam L121 and pixels corresponding to the second-second diffracted beam L122 are shifted by the second distance to overlap each other.

The first and second transmissive HOEs 1131 and 1132 separate the first beam L1 into the first-first and first-second diffracted beams L111 and L112 and the second-first and second-second diffracted beams L121 and L122, respectively, such that pixels corresponding to each other at least partially overlap each other.

Figure 30:
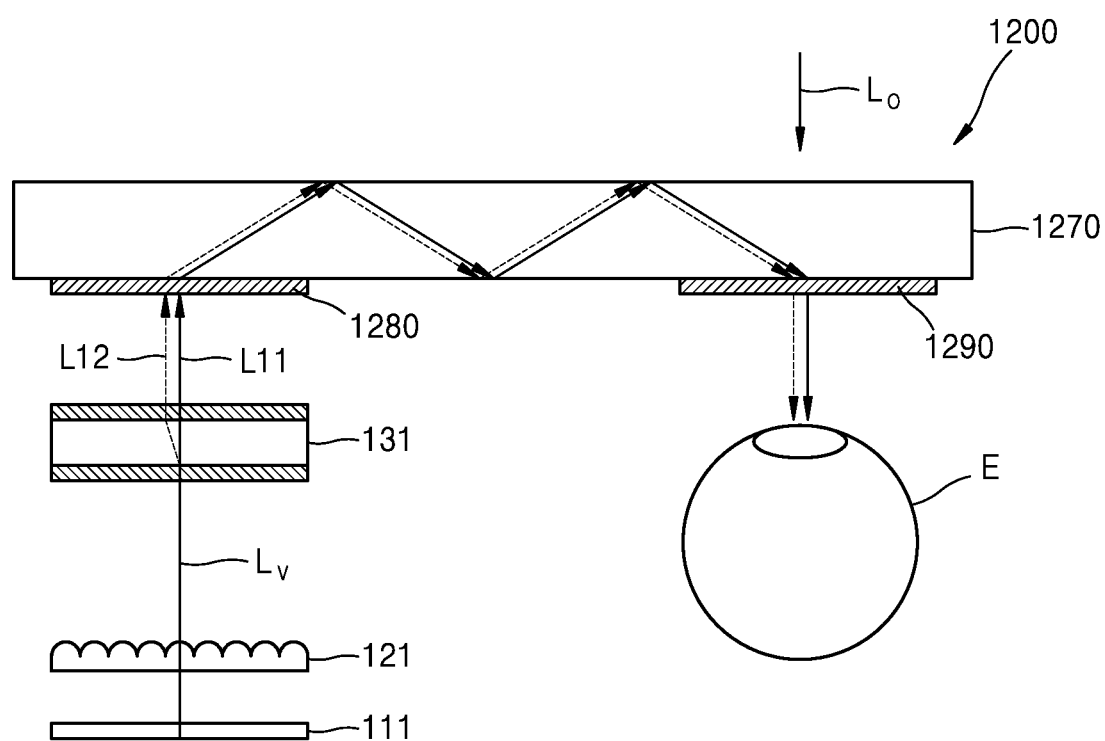
FIG. 30 schematically illustrates a display apparatus according to an embodiment of the disclosure.

FIG. 30 schematically illustrates a display apparatus 1200 according to an embodiment of the disclosure. Referring to FIG. 30, the display apparatus 1200 includes the first display panel 111, the first transmissive HOE 131, a waveguide 1270, an input coupler 1280, and an output coupler 1290. The first display panel 111 and the first transmissive HOE 131 are substantially the same as those in the above-described embodiment of the disclosure, and thus redundant descriptions are omitted.

The first display panel 111 emits a beam $L_V$ of a virtual image. The first transmissive HOE 131 diffracts and separates the beam $L_V$ of the virtual image into the first and second diffracted beams L11 and L12 such that pixels corresponding to the first diffracted beam L11 and pixels corresponding to the second diffracted beam L12 are shifted by the first distance shorter than a length of one pixel in a certain direction to overlap each other.

The waveguide 1270 may include a material that is transparent with respect to the beam $L_V$ of the virtual image and a beam $L_O$ of an external scene, and may have a flat plate shape.

The input coupler 1280 combines the first and second diffracted beams L11 and L12 separated by the first transmissive HOE 131 into the waveguide 1270. The input coupler 1280 may be, for example, a DOE or an HOE. The input coupler 1280 may be provided on a surface of the waveguide 1270 facing the first transmissive HOE 131, or a surface opposite to the surface.

The output coupler 1290 outputs, to a target area, the first and second diffracted beams L11 and L12 propagating in the waveguide 1270. The output coupler 1290 may be, for example, a DOE or an HOE. The output coupler 1290 may be provided on a surface of the waveguide 1270 facing the target area, or a surface opposite to the surface. The target area may be an eye motion box which is an area where a user's eye E is located.

Because the waveguide 1270 includes a transparent material, the beam $L_O$ of the external scene may pass through the waveguide 1270 and travel to the target area (that is, the eye motion box).

Both the beam $L_V$ of the virtual image and the beam $L_O$ of the external scene may reach the eye motion box of the user, and thus the display apparatus 1200 of the present embodiment of the disclosure may be an augmented reality device in which the user may simultaneously view the user's virtual image and external scene. Pixels corresponding to each other in the beam $L_V$ of the virtual image may be partially overlapped with each other by the first transmissive HOE 131, resulting in an increase in resolution of the display apparatus 1200 of the present embodiment of the disclosure without a decrease in brightness. Optionally, when a blocking film is provided on one side of the waveguide 1270 so as to block the beam $L_O$ of the external scene, the display apparatus 1200 may be a virtual reality device that shows only a virtual image.

Figure 31:
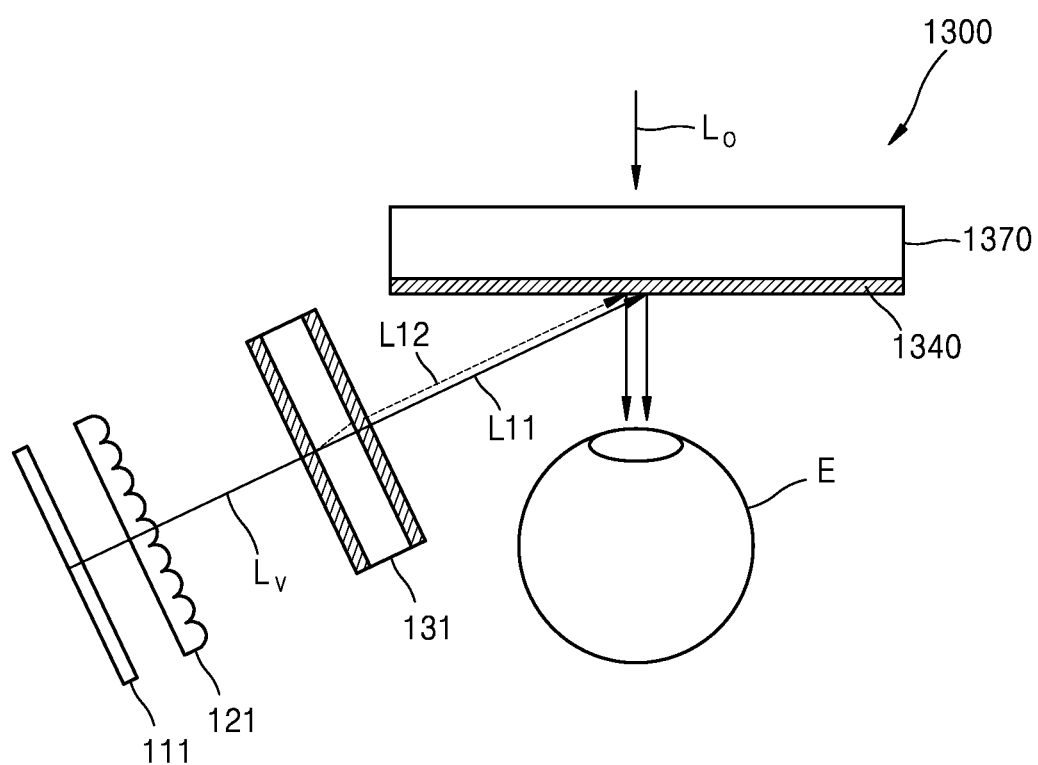
FIG. 31 schematically illustrates a display apparatus according to an embodiment of the disclosure.

FIG. 31 schematically illustrates a display apparatus 1300 according to an embodiment of the disclosure.

Referring to FIG. 31, the display apparatus 1300 includes the first display panel 111, the first transmissive HOE 131, and a reflective HOE 1370. The first display panel 111 and the first transmissive HOE 131 are substantially the same as those in the above-described embodiment of the disclosure, and thus redundant descriptions are omitted.

The first display panel 111 emits the beam $L_V$ of the virtual image. The first transmissive HOE 131 diffracts and separates the beam $L_V$ of the virtual image into the first and second diffracted beams L11 and L12 such that pixels corresponding to the first diffracted beam L11 and pixels corresponding to the second diffracted beam L12 are shifted by the first distance shorter than a length of one pixel in a certain direction to overlap each other.

The reflective HOE 1370 may reflect the beam $L_V$ of the virtual image to the target area (that is, the eye motion box) and transmit the beam $L_O$ of the external scene.

Both the beam $L_V$ of the virtual image and the beam $L_O$ of the external scene may reach the eye motion box of the user, and thus the display apparatus 1300 of the present embodiment of the disclosure may be an augmented reality device in which the user may simultaneously view the user's virtual image and external scene. Pixels corresponding to each other in the beam $L_V$ of the virtual image may be partially overlapped with each other by the first transmissive HOE 131, resulting in an increase in resolution and an increase in brightness. Optionally, when a blocking film is provided on a rear surface of the reflective HOE 1370 so as to block the beam $L_O$ of the external scene, the display apparatus 1300 may be a virtual reality device that shows only a virtual image.

Figure 32:
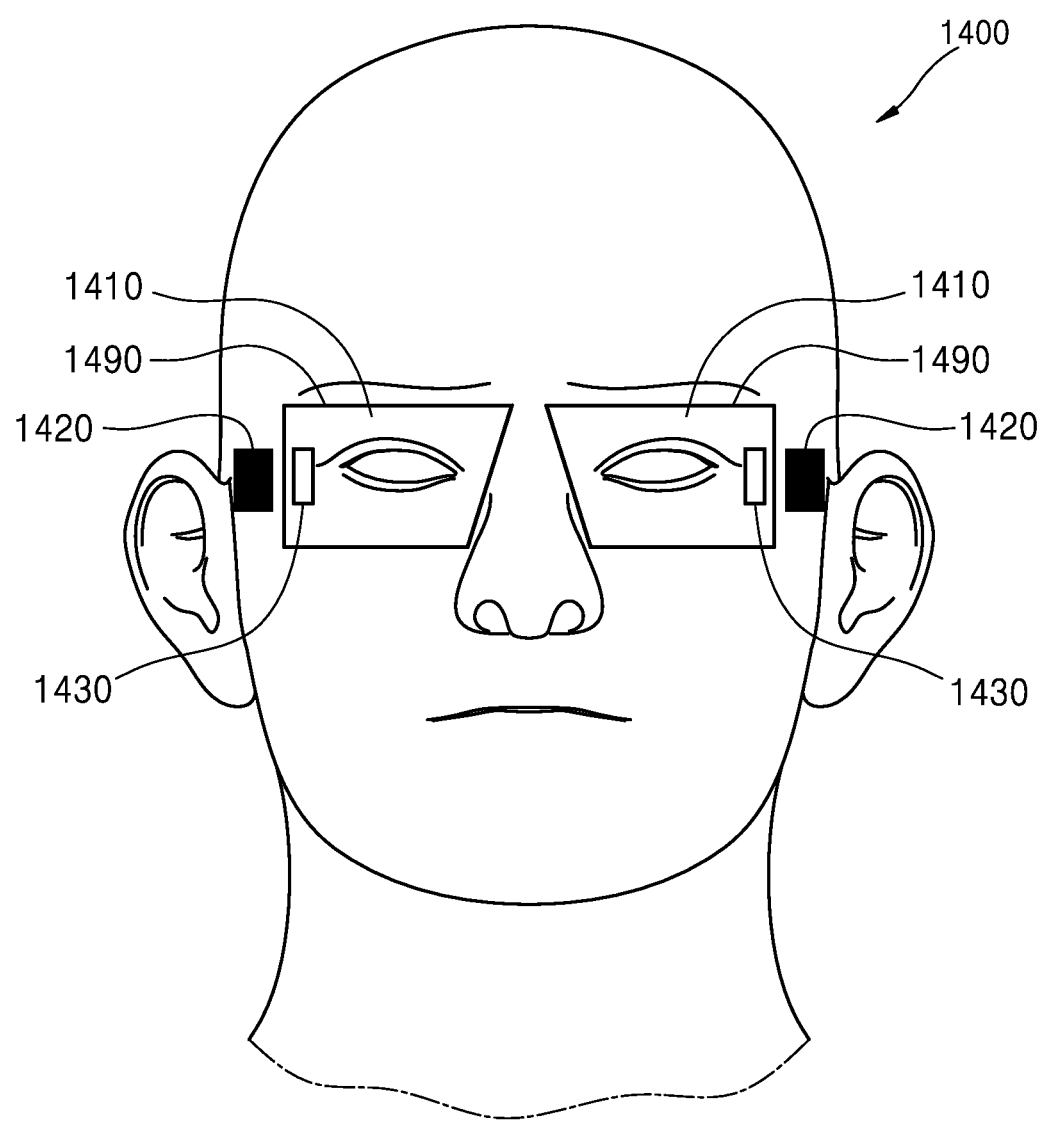
FIG. 32 schematically illustrates augmented reality glasses according to an embodiment of the disclosure.

FIG. 32 schematically illustrates augmented reality glasses 1400 according to an embodiment of the disclosure. Referring to FIG. 32, the augmented reality glasses 1400 may include an image combiner 1410 and a display engine 1420. The image combiner 1410 may be fixed to a frame 1490. The display engine 1420 may be arranged near a temple of a user's head and fixed to the frame 1490. The projectors 100, 600, 700, 800, 900, 1000, and 1100 of the above-described embodiment of the disclosure may be used as the display engine 1420. Information processing and image formation for the display engine 1420 may be performed directly by a computer of the augmented reality glasses 1400 itself, or an external electronic device, such as a smart phone, a tablet, a computer, a laptop, and all other intelligent (smart) devices, to which the augmented reality glasses 1400 are connected. Signal transmission between the augmented reality glasses 1400 and the external electronic device may be performed through wired communication and/or wireless communication. The augmented reality glasses 1400 may receive power from at least one of a built-in power source (rechargeable battery), an external device, or an external power source.

An input-coupler 1430 of the image combiner 1410 is arranged on a surface of a waveguide (see 1270 in FIG. 30) facing the display engine 1420 or a rear side thereof to input, to the waveguide, a beam output from the display engine 1420. The input beam is guided in the waveguide toward an output-coupler (see 1290 in FIG. 30) and then is output to a target area through the output-coupler. In this regard, the target area may be an eye motion box of a user.

FIG. 32 illustrates a case where the image combiner 1410 and the display engine 1420 are each provided on both left and right sides, but the disclosure is not limited thereto. In an embodiment of the disclosure, the image combiner 1410 and the display engine 1420 may be provided on one of the left and right sides. In an embodiment of the disclosure, the image combiner 1410 may be provided over the entire left and right sides, and the display engine 1420 may be provided in common on the left and right sides or may be provided to correspond to each of the left and right sides.

The augmented reality glasses 1400 are a specific example of a near-eye display apparatus. It will be obviously understood by those of ordinary skill in the art that the augmented reality glasses 1400 described with reference to FIG. 32 may be applied to display apparatuses of various forms, such as a HMD, an augmented reality helmet, and a head up display (HUD) that are worn on the head.

The brightness and resolution of the projector and display apparatus using the disclosed holographic optical element may be simultaneously increased.

While embodiments of the projector and display apparatus using the holographic optical element according to the disclosure have been shown and described, these are merely examples and those of ordinary skill in the art would understand that various modifications and an equivalent embodiment of the disclosure may be possible therefrom. Therefore, the true technical scope of the disclosure should be defined by the appended claims.

What is claimed is:

1. A projector comprising:
   a first display panel configured to emit a first beam corresponding to a first image;
   a second display panel configured to emit a second beam corresponding to a second image;
   a first transmissive holographic optical element configured to separate the first beam into a first diffracted beam and a second diffracted beam and transmit the first diffracted beam and the second diffracted beam, such that pixels corresponding to the first diffracted beam and pixels corresponding to the second diffracted beam are shifted by a first distance to overlap each other, the first distance being shorter than a length of one pixel;
   a second transmissive holographic optical element configured to separate the second beam into a third diffracted beam and a fourth diffracted beam and transmit the third diffracted beam and the fourth diffracted beam, such that pixels corresponding to the third diffracted beam and pixels corresponding to the fourth diffracted beam are shifted by a second distance to overlap each other, the second distance being shorter than the length of one pixel;
   a reflective holographic optical element configured to transmit the first diffracted beam and the second diffracted beam, and diffract and reflect the third diffracted beam and the fourth diffracted beam in a same direction as the first diffracted beam and the second diffracted beam, such that the first image and the second image at least partially overlap each other; and
   a projection lens configured to project a beam corresponding to an overlapping image created by at least partially overlapping the first image and the second image with each other.

2. The projector of claim 1, wherein the first transmissive holographic optical element comprises:
a first holographic diffractive layer configured to diffract the first beam into the first diffracted beam and the second diffracted beam; and
a second holographic diffractive layer configured to diffract and transmit the first diffracted beam and the second diffracted beam in a same direction with the first distance therebetween, and
wherein the second transmissive holographic optical element comprises:
a third holographic diffractive layer configured to diffract the second beam into the third diffracted beam and the fourth diffracted beam; and
a fourth holographic diffractive layer configured to diffract and transmit the third diffracted beam and the fourth diffracted beam in a same direction with the second distance therebetween.

3. The projector of claim 2, wherein the first diffracted beam is a zero-order diffracted beam of the first beam diffracted through the first holographic diffractive layer, the second diffracted beam is a first-order diffracted beam of the first beam diffracted through the first holographic diffractive layer, the third diffracted beam is a zero-order diffracted beam of the second beam diffracted through the third holographic diffractive layer, and the fourth diffracted beam is a first-order diffracted beam of the second beam diffracted through the fourth holographic diffractive layer.

4. The projector of claim 2, wherein a thickness (T) of the first transmissive holographic optical element satisfies:

$$d = |T(\tan\theta_1 - \tan\theta_2)|$$

where $\theta_1$ is a diffraction angle of the first diffracted beam of the first holographic diffractive layer, $\theta_2$ is a diffraction angle of the second diffracted beam of the first holographic diffractive layer, and d is the first distance.

5. The projector of claim 1, wherein the first distance is a/n, where a is the length of the one pixel in a certain direction, and n is an integer.

6. The projector of claim 1, wherein the first distance and the second distance are equal to each other.

7. The projector of claim 6, wherein a is a diagonal length of the one pixel,
the first distance and the second distance are a/2, and
the reflective holographic optical element is configured such that, based on pixels corresponding to each other, a pixel corresponding to the third diffracted beam is shifted by a distance of a/4 in a diagonal direction with respect to a pixel corresponding to the first diffracted beam to overlap the pixel corresponding to the first diffracted beam.

8. The projector of claim 6, wherein a is a diagonal length of the one pixel, the first distance and the second distance are a/4, and
the reflective holographic optical element is configured such that, based on pixels corresponding to each other, a pixel corresponding to the third diffracted beam is shifted by a distance of a/2 in a diagonal direction with respect to a pixel corresponding to the first diffracted beam to overlap the pixel corresponding to the first diffracted beam.

9. The projector of claim 1, wherein the first transmissive holographic optical element is configured such that a quantity of light of the first diffracted beam and a quantity of light of the second diffracted beam are substantially equal to each other, and the second transmissive holographic optical element is configured such that a quantity of light of the third diffracted beam and a quantity of light of the fourth diffracted beam are substantially equal to each other.

10. The projector of claim 1, wherein the first transmissive holographic optical element and the reflective holographic optical element contact each other.

11. The projector of claim 1, further comprising:
a third display panel configured to emit a third beam corresponding to a third image;
a third holographic optical element configured to separate the third beam into a fifth diffracted beam and a sixth diffracted beam and transmit the fifth diffracted beam and the sixth diffracted beam, such that pixels corresponding to the fifth diffracted beam and pixels corresponding to the sixth diffracted beam are shifted by a third distance to overlap each other, the third distance be shorter than the length of one pixel; and
a second reflective holographic optical element configured to transmit the first diffracted beam, the second diffracted beam, the third diffracted beam, and the fourth diffracted beam, and diffract and reflect the fifth diffracted beam and the sixth diffracted beam in a same direction as the first diffracted beam, the second diffracted beam, the third diffracted beam, and the fourth diffracted beam, such that pixels of the first image, pixels of the second image, and pixels of the third image at least partially overlap each other.

12. The projector of claim 11, wherein the reflective holographic optical element and the second reflective holographic optical element are arranged apart from each other, and the second reflective holographic optical element is disposed outside a path of the second beam, between the second transmissive holographic optical element and the reflective holographic optical element.

13. The projector of claim 11, wherein the reflective holographic optical element and the second reflective holographic optical element contact each other.

14. The projector of claim 1, further comprising a correction holographic optical element disposed between the second display panel and the reflective holographic optical element, and configured to correct distortion of the third diffracted beam and the fourth diffracted beam caused by diffraction and reflection by the reflective holographic optical element.

15. A display apparatus comprising:
a projector; and
an image combiner configured to guide a beam emitted from the projector to a target area,
wherein the target area is an eye motion box of a user, and
wherein the projector comprises:
a first display panel configured to emit a first beam corresponding to a first image;
a second display panel configured to emit a second beam corresponding to a second image;
a first transmissive holographic optical element configured to separate the first beam into a first diffracted beam and a second diffracted beam and transmit the first diffracted beam and the second diffracted beam, such that pixels corresponding to the first diffracted beam and pixels corresponding to the second diffracted beam are shifted by a first distance to overlap each other, the first distance being shorter than a length of one pixel;
a second transmissive holographic optical element configured to separate the second beam into a third diffracted beam and a fourth diffracted beam and transmit the third diffracted beam and the fourth diffracted beam, such that pixels corresponding to the third diffracted beam and pixels corresponding to the fourth diffracted beam are shifted by a second distance to overlap each other, the second distance being shorter than the length of one pixel;

a reflective holographic optical element configured to transmit the first diffracted beam and the second diffracted beam, and diffract and reflect the third diffracted beam and the fourth diffracted beam in a same direction as the first diffracted beam and the second diffracted beam, such that the first image and the second image at least partially overlap each other; and a projection lens configured to project a beam corresponding to an overlapping image created by at least partially overlapping the first image and the second image with each other.

* * * * *